United States Patent [19]

Nohmi

[11] Patent Number: 4,481,260
[45] Date of Patent: Nov. 6, 1984

[54] AROMATIC POLYSULFONE TYPE RESIN HOLLOW FIBER MEMBRANE AND PROCESS FOR PRODUCING THE SAME

[75] Inventor: Takashi Nohmi, Fuji, Japan

[73] Assignee: Asahi Kasei Kogyo Kabushiki Kaisha, Osaka, Japan

[21] Appl. No.: 461,992

[22] Filed: Jan. 28, 1983

[30] Foreign Application Priority Data

Jan. 29, 1982 [JP] Japan ................................ 57-12864

[51] Int. Cl.³ .............................................. D02G 3/00
[52] U.S. Cl. ................. 428/398; 210/500.2; 264/41
[58] Field of Search .................. 428/376, 398; 210/500.2; 264/41

[56] References Cited

U.S. PATENT DOCUMENTS

| | | | |
|---|---|---|---|
| 3,691,068 | 9/1972 | Cross | 210/636 |
| 4,061,821 | 12/1977 | Hayano et al. | 210/500.2 X |
| 4,208,508 | 6/1980 | Hashino et al. | 210/500.2 X |
| 4,286,015 | 8/1981 | Yoshida et al. | 428/398 X |

OTHER PUBLICATIONS

Cabasso, Klein and Smith, *Polysulfone Hollow Fibers I, Spinning and Properties*, Journal of Applied Polymer Science, vol. 20, pp. 2377-2394, (1976).
Cabasso, Klein and Smith, *Polysulfone Hollow Fibers II, Morphology*, Journal of Applied Polymer Science, vol. 21, pp. 165-180, (1977).

Primary Examiner—Lorraine T. Kendell
Attorney, Agent, or Firm—Finnegan, Henderson, Farabow, Garrett & Dunner

[57] ABSTRACT

An aromatic polysulfone type resin hollow fiber membrane having a thickness of less than 100 μm and a three-layer structure of inner and outer surface skin layers and a void layer disposed therebetween and connected thereto. The hollow fiber membrane of the kind has an improved burst strength, while exhibiting an extremely excellent water permeability. Such a hollow fiber membrane can be produced by a process which comprises extruding a spinning solution of an aromatic polysulfone type resin in an organic polar solvent for said resin, said solution containing a glycol and having a resin concentration of from 10 to 35% by weight, from an annular spinning nozzle of which the orifice width is 10 to 110 μm while simultaneously injecting an internal coagulating liquid into the annular spinning nozzle at an inside bore thereof, thereby to obtain an extrudate in the form of a hollow fiber, and introducing said extrudate into an external coagulating liquid.

2 Claims, 15 Drawing Figures

AROMATIC POLYSULFONE TYPE RESIN HOLLOW FIBER MEMBRANE AND PROCESS FOR PRODUCING THE SAME

This invention relates to an aromatic polysulfone type resin hollow fiber membrane and a process for producing the same. More particularly, this invention is concerned with an aromatic polysulfone type resin hollow fiber membrane with a three-layer structure of inner and outer surface skin layers and a void layer disposed therebetween and connected thereto, which is extremely excellent in water permeabilty as well as in burst strength, and also is concerned with a process for producing the same.

There have hitherto been published many papers concerning aromatic polysulfone membranes and aromatic polyether sulfone membranes, but a limited number of them disclose the structure of such membranes. A membrane comprising a surface layer and a void layer as the support layer is disclosed in the specification of U.S. Pat. No. 3,615,024 assigned to Amicon Corporation as well as in Journal of Applied Polymer Science, 20, 2377-2394, ibid 21, 165-180 and 1883-1900 (1977) in which the reporter is Gulf South Research Institute. A hollow fiber membrane disclosed in the U.S. Pat. No. 3,615,024 specification has a dense surface layer on the inner surface thereof but has no such a layer on the outer surface thereof. The hollow fiber membrane of this prior art has a plurality of voids which opens at the outer surface of the membrane, said voids are being defined by portions where the polymer is deficient, and each having a size as large as 10 μm or more. The hollow fiber membrane with such a structure has such drawbacks that:

1 they are poor in mechanical strength;
2 they are impossible to back-wash; and
3 they are liable to be plugged or fouled.

The membranes disclosed in the latter were developed for use as supports for reverse osmosis membrane, and each of the membranes has, in both surface portions thereof, a number of pores of 250 Å to 0.44 μm in average diameter. The water permeability of such membranes is at most 1.3 m$^3$/m$^2$·day·atm and, hence, of little practical use in ultrafiltration.

As described above, each of the conventional hollow fiber membranes is of little practical use because of its poor mechanical properties and low water permeability and, hence, there has been a strong demand in the art for development of a hollow fiber membrane having improved mechanical properties as well as a high water permeability.

As a result of the intensive studies made by us, it has been found that a hollow fiber membrane made of an aromatic polysulfone type resin and having a three-layer structure has improved mechanical properties, while exhibiting an extremely excellent water permeability. The present invention has been made based upon such a novel finding.

It is, therefore, an object of the present invention to provide a hollow fiber membrane which is extremely excellent in water permeability as well as in burst strength.

It is another object of the present invention to provide a process for producing a hollow fiber membrane of the kind mentioned above.

The foregoing and other objects, features and advantages of the present invention will be apparent to those who skilled in the art from the following detailed description taken in conjunction with the accompanying drawings in which.

Figure 1:
FIG. 1 is a scanning electron photomicrograph (magnification: ×230) of a freeze-broken entire cross section of a hollow fiber membrane according to the present invention, said cross section being taken along the plane perpendicular to the fiber axis of said membrane.
Figure 2:
FIG. 2 is a scanning electron photomicrograph (magnification: ×100) showing an outer surface of the hollow fiber membrane shown in FIG. 1.

In one aspect of the present invention, there is provided an aromatic polysulfone type resin hollow fiber membrane having a thickness of less than 100 μm and a three-layer structure of inner and outer surface skin layers and a void layer disposed therebetween and connected thereto; said void layer having a thickness of at least 5 μm and comprising at least 30 voids each having a length of 5 μm or more in a radial direction of a cross section of said hollow fiber membrane, said inner and outer skin layers each having a maximum pore diameter of 0.80 μm or less and a thickness of 0.1 to 10 μm, provided that the average value of thicknesses of said inner and outer surface skin layers is ½ or less the thickness of said void layer.

The present invention will now be described in detail.

As the aromatic polysulfone type resin to be used for forming an aromatic polysulfone type resin hollow fiber membrane, there can be mentioned an aromatic polysulfone and an aromatic polyether sulfone respectively comprised of recurring units of the general formulae (I) and (II)

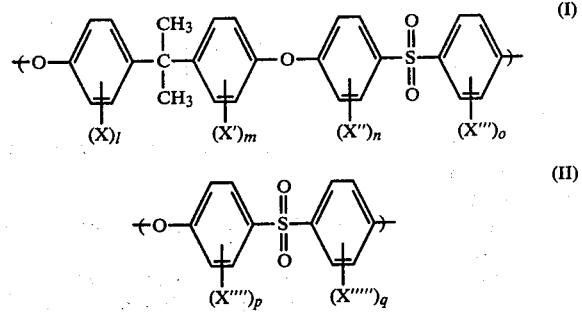

(wherein X, X', X'', X''', X'''' and X''''' each independently stand for a non-dissociative substituent such as a lower alkyl group selected from the group consisting of methyl, ethyl, n-propyl and n-butyl or a halogen atom selected from the group consisting of F, Cl, I and Br, or a dissociative substituent such as —COOH, —SO$_3$H, —NH$_2$ or the like, and l, m, n, o, p, q each independently stand for an integer of from 0 to 4). These aromatic polysulfone type resins each preferably have a number average molecular weight of 5,000 to 100,000 as determined according to the osmotic pressure method. These aromatic polysulfone type resins are capable of providing hollow fiber membranes which are excellent in heat resistance, acid resistance, alkali resistance, chemicals resistance and mechanical strength.

The hollow fiber membrane of the present invention which is made of the above-mentioned aromatic polysulfone or aromatic polyether sulfone has a three-layer structure of a dense inner surface skin layer (hereinafter often abbreviated as "Ai layer"), a void layer (hereinafter often abbreviated at "B layer") and a dense outer surface skin layer (hereinafter often abbreviated as "Ao layer"). The larger the thickness of the hollow fiber membrane, the higher the burst strength but, needless to say, the lower the water permeability. The hollow fiber membrane of the present invention has a thickness as small as less than 100 μm, preferably 5 to 90 μm and has a water permeability as high as 9 m$^3$/m$^2$·day·atm or more (in some cases, as high as 30 m$^3$/m$^2$·day·atm). It is surprising that, in spite of such a small membrane thickness, the hollow fiber membrane of the present invention has a burst strength as high as 15 kg/cm$^2$ or more (in some cases, as high as 32 kg/cm$^2$). The outer diameter of the hollow fiber membrane of the present invention is small and usually is in the range of 100 to 700 μm.

It is apparent from the foregoing, the hollow fiber membrane of the present invention has excellent mechanical properties, especially has an improved burst strength, in spite of its reduced membrane thickness and outer diameter. Accordingly, the hollow fiber membrane of the present invention can advantageously be employed in the applications where the use of a fine and thin hollow fiber is required. For example, a fine and thin hollow fiber membrane can advantageously be employed in the cases where: (1) high rate of low-viscosity liquid filtration is needed so that a large amount of the filtrate can be obtained; (2) the liquid to be subjected to filtration is valuable and, hence, the filtration is required to be performed with a narrow dead space so that no filtrate remains in the membrane after the filtration.

Further, the hollow fiber membrane of the present invention has a cut-off molecular weight of less than 100,000. A hollow fiber membrane having a cut-off molecular weight of less than 100,000 can be defined as a membrane being capable of cutting off: 25% or more of bovine serum albumin (molecular weight: 67,000); 90% or more of β-galactose DH (molecular weight: 95,000); and 15% or more of dextran T-500 (molecular weight: 500,000).

The basic structure of the hollow fiber membrane of the present invention will now be explained.

As mentioned above, the hollow fiber membrane of the present invention has a three-layer structure of an Ai layer, a B layer and an Ao layer. The thickness of each of the Ai layer and the Ao layer is in the range of 0.1 to 10 μm. It is required that the average value of the thicknesses of the Ai layer and the Ao layer is ½ or less the thickness of the B layer. If the average value of the thicknesses of the Ai layer and the Ao layer exceeds ½ the thickness of the B layer, the resulting hollow fiber membrane has a poor water permeability due to the presence of too thick skin layers which cause an increase of the permeation resistance of the membrane, or, has a descreased burst strength due to a uniform structure in which no voids are present. The Ai layer and the Ao layer are the layers in each of which pores selected from Cp pores, Up pores and Np pores (all of which will be mentioned later) are present. In the case where the surface skin layer possesses Cp pores or Up pores, the maximum pore diameter of such pores is in the range of 0.80 μm or less, preferably 0.50 μm or less, as measured by means of a scanning electron photomicrograph. When the maximum pore diameter of the pores present in the surface skin layer exceeds 0.80 μm, the burst strength and the compression strength of the resulting hollow fiber membrane is lowered. Further, if the pores present in the skin layers have a maximum pore diameter exceeding 0.80 μm, there is a danger of contamination of the filtrate, because the skin layer containing such pores allows bacteria to pass therethrough easily. The bacteria which intrude into the membrane propagate, bringing about accumulation of waste substances in the membrane. The hollow fiber membrane having such pores in its respective surface skin layers cannot be employed for preparation of the absolutely-purified water, because the water to be treated is easily contaminated by impurities, thereby causing lowering in specific resistance. Further, the hollow fiber membrane of this kind cannot be used for separation and purification of food stuffs or medical products, because, as is mentioned above, the filtrate is liable to be contaminated by bacteria. Especially, the use of such hollow fiber membrane in the medical applications involves a serious problem, because, due to the intrusion of bacteria into the membrane, the filtrate is liable to be contaminated by a large amount of pyrogenic substances which are very harmful to the human body.

For the reasons as set forth hereinabove, it is required that the pores present in the surface skin layers have a maximum pore diameter of 0.80 μm or less, preferably 0.50 μm or less. Further, it is preferred that the pores present in the surface skin layers have an average pore diameter of 0.50 μm or less.

As mentioned above, the Ai layer and Ao layer of the hollow fiber membrane of the present invention have pores selected from Cp pores, Up pores and Np pores. The Ai layer and Ao layer serve to permeate selectively molecules therethrough according to the size of molecules. Specifically, the Ai layer and Ao layer cut off large size molecules, while they allow molecules of small size to pass therethrough. The larger the thickness of any of the Ai and the Ao layers, the larger both the permeation resistance of the membrane and the mechanical properties of the membrane. Since the hollow fiber membrane of the present invention has two surface skin layers, i.e., the Ai layer and the Ao layer, leakage of molecules which must be cut off can be prevented even when one of these two surface skin layers accidentally becomes defective. Accordingly, by the use of a hollow fiber membrane of the present invention which possesses two surface skin layers, contrary to the case where a conventional hollow fiber having only one surface skin layer is employed, a safer filtration operation is ensured, and further, a cut-off molecular weight becomes sharp.

Between the Ai layer and the Ao layer are present at least 30 voids, which form a void layer, i.e., a B layer. In a cross section of the hollow fiber, each void has a length of 5 μm or more in a radial direction of the cross section of the hollow fiber. The thickness of the B layer is varied depending upon the membrane thickness, but usually at least 5 μm or more, preferably in the range of 5 to 90 μm. The voids are defined by portions where the polymer is deficient.

With respect to the shape of the void, there can be mentioned conic shape, spindle shape, cylindrical shape and spherical shape.

The observation of the entire cross section of the hollow fiber shows that the voids, as a whole, form an annulus having an almost uniform thickness and surrounded on its both sides by the Ai layer and the Ao layer, respectively.

Where 100 or more of voids are present in the B layer, the thickness of the B layer is determined as follows. The thickness of the B layer is obtained by using a scanning electron photomicrograph (magnification: ×100 to 500) showing an entire cross section of the hollow fiber, which cross section is taken along the plane perpendicular to the fiber axis. In such a photomicrograph, the thickness of the B layer is defined as a distance between a point at which a straight line drawn from the center of the cross section of the central bore of the hollow fiber in a radial direction thereof intersects the inner periphery of the annulus and another point at which the same straight line as mentioned just above intersects the outer periphery of said annulus. The inner and outer peripheries as mentioned above are determined as follows. First, determination of the outer periphery of the B layer is explained. Use is made of a scanning electron photomicrograph (magnification: ×100 to 500) of an entire cross section of a hollow fiber of the present invention. From the center of the cross section of the central bore of the hollow fiber, six lines are drawn, at angular intervals of 60°, in radial directions, thereby to form six fractions. Among the voids present in each of said six fractions, selected is a void extending most deeply into the exterior of the hollow fiber. On the periphery of the thus selected void, a point which is closest to the outer surface of the membrane is selected. Then, a distance between the above-mentioned point and the center of the cross section of the central bore of the hollow fiber is measured. As a result, six values in total with respect to the above-defined distance are obtained. Next, another set of six fractions is formed by shifting the phase of each fraction formed above by 20° in a clockwise direction. The same distance measurement as mentioned above is repeated, thereby to obtain another set of six values. Further, the phase of each of the six fractions obtained in the second attempt is shifted again by 20° in a clockwise direction, and six values are obtained in the same manner as mentioned hereinabove. In grand total, eighteen values are obtained. The arithmetical average of the thus obtained eighteen values is obtained. Then, a circle having a radius of a length corresponding to the above-obtained average value is drawn around the center of the cross section of the central bore of the hollow fiber shown in the electron photomicrograph. The outer periphery of the B layer is defined as the circle thus obtained.

The inner periphery of the B layer is determined in the same manner as mentioned above except that, from each fraction, a void extending most deeply into the interior of the membrane is selected; on the periphery of the thus selected void, a point which is closest to the inner surface of the membrane is selected; and a distance between the above-mentioned point and the center of the cross section of the central bore of the hollow fiber is measured.

On the other hand, where the member of voids present in the B layer is less than 100, the thickness of the B layer is determined as follows. Use is made of a scanning electron photomicrograph (magnification: ×100 to 500) of an entire cross section of the hollow fiber, which cross section is taken along the plane perpendicular to the fiber axis. From the voids shown in this photomicrograph, selected is a void of which the length is largest (the term "length" used herein means a length in a radial direction of the cross section). Taking the thus selected void as a standard, 30 voids are selected in order of length. The thickness of the B layer is defined as the arithmetical average of the lengths of the thus selected 30 voids.

The B layer functions as a support layer which contributes to the improvement in mechanical strength of the hollow fiber membrane. While, the B layer has such a function that it enables the liquid flowing into one surface skin layer of the present hollow fiber membrane to reach the other surface skin layer smoothly, without any resistance, thereby causing the water permeability of the hollow fiber membrane to be high. Accordingly, it can be said that the B layer much contribute to the improvement not only in mechanical strength such as burst strength but also in water permeability of the hollow fiber membrane. In the hollow fiber membrane of the present invention, it is preferred that the thickness of the void layer be 50 to 90% of the whole membrane thickness.

With respect to the thicknesses of the Ai layer and the Ao layer, they are determined as follows. Where the number of voids present in the B layer is 100 or more, the thicknesses of the Ai layer and the Ao layer are determined as follows.

(1) Thickness of the Ao layer;

Use is made of a scanning electron photomicrograph (magnification: ×1000 to 10000) of an entire cross section of a hollow fiber of the present invention. From the center of the cross section of the central bore of the hollow fiber, six lines are drawn, at angular intervals of 60°, in radial directions, thereby to form six fractions. Among the voids present in each of said six fractions, selected is a void extending most deeply into the exterior of the hollow fiber. On the periphery of the thus selected void, a point which is closest to the outer surface of the membrane is selected. Then, measured is a distance between the abovementioned point and a point at which a straight line drawn from the center of the cross section of the central bore of the hollow fiber in a radial direction thereof and passing said point of the selected void intersects the outer surface of the membrane.

As a result, six values in total with respect to the above-defined distance are obtained. Next, another set of six fractions is formed by shifting the phase of each fraction formed above by 20° in a clockwise direction. The same distance measurement as mentioned above is repeated, thereby to obtain another set of six values. Further, the phase of each of the six fractions obtained in the second attempt is shifted again by 20° in a clockwise direction, and six values are obtained in the same manner as mentioned hereinabove. In grand total, eighteen values are obtained. The arithmetical average of the thus obtained eighteen values is obtained. The thickness of the Ao layer is defined as the average value thus obtained.

(2) Thickness of the Ai layer:

The thickness of the Ai layer is determined in the same manner as mentioned in (1) above except that, from each fraction, a void extending most deeply into the interior of the membrane is selected; on the periphery of the void, a point closest to the inner surface of the membrane is selected; and a distance between the above-mentioned point and a point at which a straight line drawn from the center of the cross section of the central bore of the hollow fiber in a radial direction thereof and passing said point of the selected void intersects the inner surface of the membrane.

Where the number of voids present in the B layer is less than 100, the thicknesses of the Ai layer and the Ao layer are determined as follows.

(1) Thickness of the Ai layer:

Use is made of a scanning electron photomicrograph (magnification: 1000 to 10000) of an entire cross section of the hollow fiber. On the periphery of each void shown in the photomicrograph, a point which is closest to the inner surface of the membrane is selected. Then, with respect to all the voids shown in the photomicrograph, a distance between the above-mentioned point and a point at which a straight line drawn from the center of the cross section of the central bore of the hollow fiber in a radial direction thereof and passing said point of the void intersects the inner surface of the membrane is measured. As a result, corresponding number of distance values to the number of voids are obtained. Taking the smallest value as a standard, 30 distance values are selected in order of length. The thickness of the Ai layer is defined as the arithmetical average of the thus obtained 30 distance values.

(2) Thickness of the Ao layer:

Thickness of the Ao layer is determined in the same manner as mentioned in (1) above except that, on the periphery of each void shown in the photomicrograph, a point which is closest to the outer surface of the membrane is selected; and with respect to all of the voids shown the photomicrograph, a distance between the above-mentioned point and a point at which a straight line drawn from the center of the cross section of the central bore of the hollow fiber in a radial direction thereof and passing said point of the void intersects the outer surface of the membrane is measured.

As is apparent from the definition of the thickness of the Ai, B, Ao layers are mentioned above, the total of the thickness of each layer is not always identical with the whole membrane thickness of the hollow fiber.

The micro-structure of each layer will now be described in detail by reference to FIGS. 3 through 8. However, each of the micro-structures shown in FIGS. 3 through 8 is given as one example, and, the micro-structure of each layer of the present hollow fiber membrane is not limited to that shown in FIGS. 3 through 8.

Figure 3:
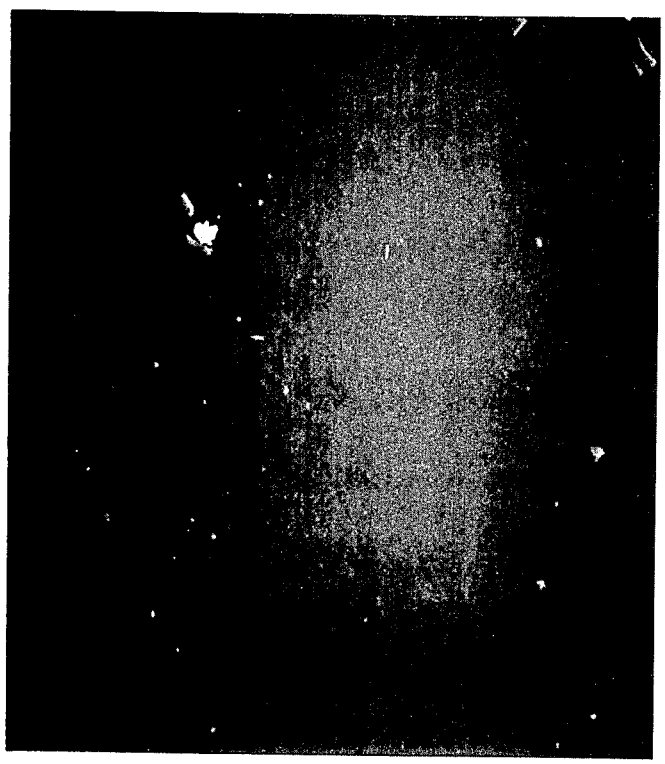
FIG. 3 is a scanning electron photomicrograph (magnification: ×10000) showing an inner surface of the hollow fiber membrane shown in FIG. 1.

From FIG. 3, it is observed that the inner surface of this hollow fiber membrane is very smooth. The presence of pores cannot be confirmed from FIG. 3.

Figure 4:
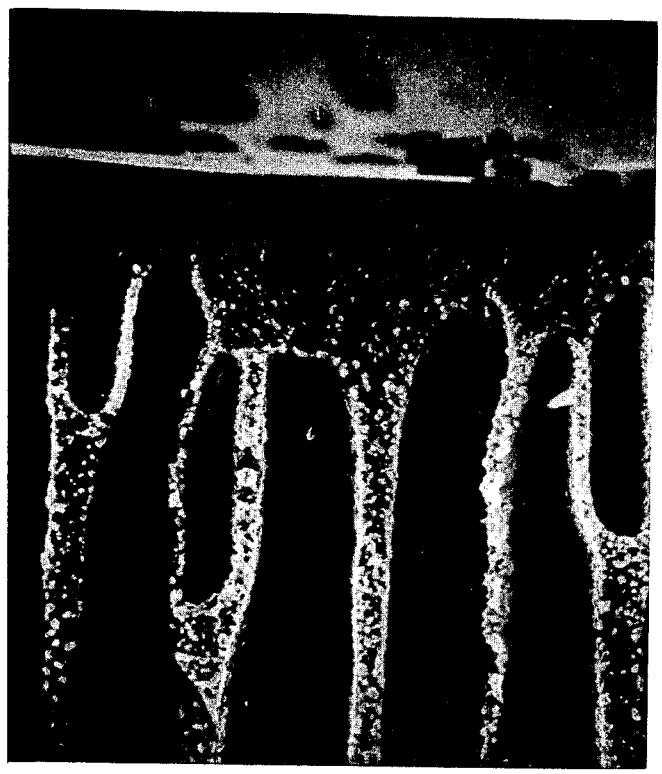
FIG. 4 is a scanning electron photomicrograph (magnification: ×10000) showing a portion of the cross section shown in FIG. 1, which portion includes part of the inner surface skin layer, i.e., the Ai layer and the void layer, i.e., the B layer.
Figure 5:
FIG. 5 is a scanning electron photomicrograph (magnification: ×30000) showing an enlarged view of the portion shown in FIG. 4.

With respect to a dense skin layer present on said inner surface of the membrane, i.e., the Ai layer, as is shown in FIGS. 4 and 5, it is comprised of globular polymer particles densely aggregated therein. Each polymer particle has a diameter as small as 0.5 μm or so. The pores present in the Ai layer are so small that they cannot be observed by the observation using a scanning electron microscope of 10,000 magnifications. However, by the measurement of the permeation resistance effected by passing aqueous solutions of dextran molecules or of various proteins, it is confirmed that there are formed micropores of which the diameter is in the range of approximately 10 to 100Å. The micropores of the kind as mentioned above are hereinafter referred to as "Np pores".

Figure 6:
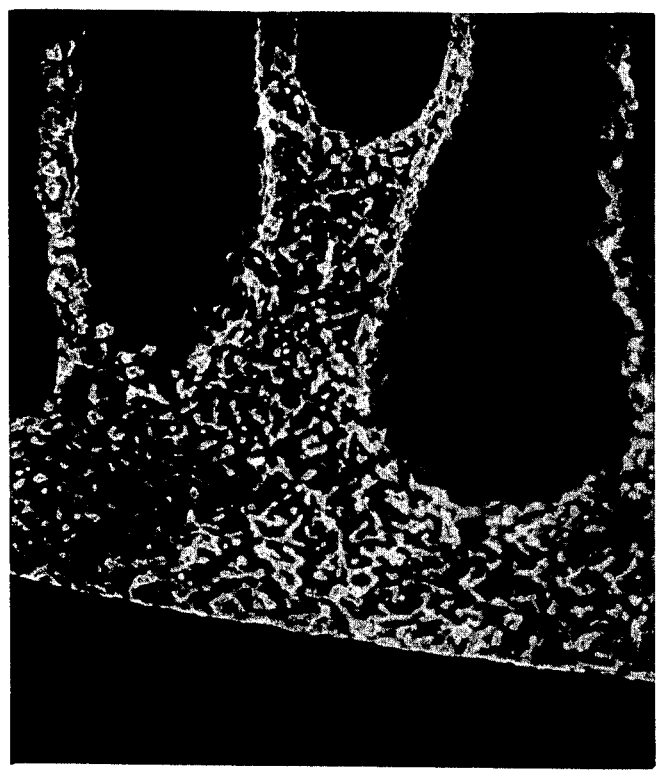
FIG. 6 is a scanning electron photomicrograph (magnification: ×10000) showing a portion of the cross section shown in FIG. 1, which portion includes part of the outer surface skin layer, i.e., the Ao layer and the void layer, i.e., the B layer.
Figure 7:
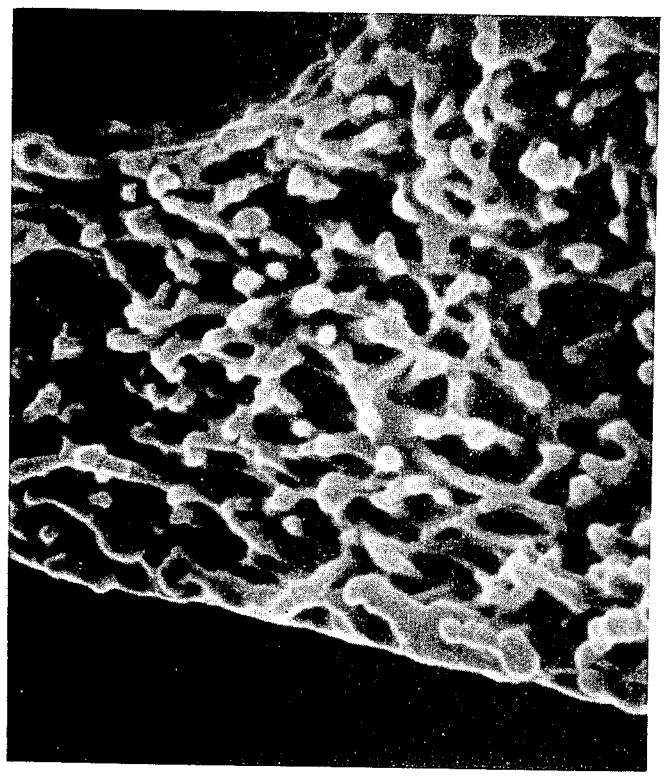
FIG. 7 is a scanning electron photomicrograph (magnification: ×30000) showing an enlarged view of the portion shown in FIG. 6.
Figure 8:
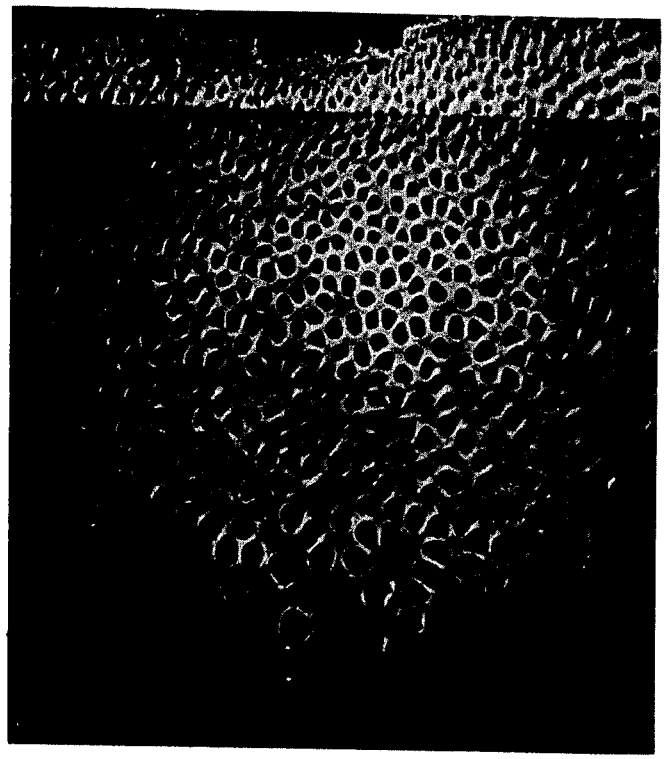
FIG. 8 is a scanning electron photomicrograph (magnification: ×1000) of a portion of a freeze-broken, oblique cross section showing the arrangement of voids of the hollow fiber membrane shown in FIGS. 1 through 7.

With respect to the outer surface skin layer, i.e., the Ao layer, as is shown in FIGS. 6 and 7, the globular polymer particles are linked together, forming cylindrical aggregations each comprising a plurality of globular polymer particles. The Ao layer has a structure in which such cylindrical aggregations are densely present. The pores present in this layer are the so-called Up pores (as will be mentioned later).

The void layer disposed between the Ai layer and the Ao layer, i.e., the B layer, contains a plurality of voids. From a scanning electron photomicrograph given in FIG. 8, the arrangement of voids are clearly observed. As is apparent from FIG. 8, in the B layer, the voids are densely and regularly present in a thicknesswise direction of the membrane. As shown in FIG. 1, the voids have their respective longitudinal axes directed to the fiber axis, and each void has a length larger in a radial direction of the hollow fiber than in a direction perpendicular to said radial direction.

With respect to the Cp pores and the Up pores as mentioned in the foregoing, an explanation will be given below.

With respect to the Cp pores, as described in "Kobunshi Ronbun Shu", vol. 34, No. 3, pp. 205–216

(1977), published by the Polymer Society of Japan, wherein a water-in-soil type sphere as small as about 100 Å (small particle of emulsion) the oil is occupied by a polymer-rich phase and the water is occupied by a polymer-lean phase, there are formed structures called Cp pores. The Cp pore is characterized by having a circular shape in front and in cross section. On the other hand, a pore having a long and narrow shape is called a Up pore.

In another aspect of the present invention, there is provided a process for producing an aromatic polysulfone type resin hollow fiber membrane which comprises extruding a spinning solution of an aromatic polysulfone type resin in an organic polar solvent for said resin, said solution containing a glycol and having a resin concentration of 10 to 35% by weight, from an annular spinning nozzle which is provided with a resin-extruding annular orifice having an orifice width of 10 to 100 μm as measured on the resin-extruding side of the nozzle while simultaneously injecting as internal coagulating liquid a liquid miscible with said organic polar solvent but incapable of dissolving the polysulfone type resin into the annular spinning nozzle at an inside bore thereof, thereby to obtain an extrudate in the form of a hollow fiber, and introducing said extrudate into an external coagulating liquid comprising a liquid miscible with said organic polar solvent but incapable of dissolving the polysulfone type resin.

The important features of the process of the present invention are: adding a glycol as an additive into a spinning solution; controlling the resin concentration of a spinning solution to an appropriate value; and adjusting the membrane thickness of the hollow fiber to an appropriate value.

Any organic polar solvent can be used in the process of the present invention as far as it is capable of dissolving therein an aromatic polysulfone type resin. As preferred examples of such a solvent, there can be mentioned N-methylpyrrolidone, dimethylformamide, dimethylacetamide and diethylacetamide.

In the process of producing a hollow fiber membrane of the present invention, addition of a glycol into a spinning solution is of crucial importance. In the formation of a hollow semipermeable membrane, it is presumed that the polymer dissolved in the organic polar solvent precipitates around the glycol phases serving as nuclei when the coagulating liquids penetrate into the inside of the membrane through the inner and outer surfaces thereof, causing the respective boundary portions of the glycol phases to be converted to form micropores. The glycol phases are crucial as nuclei for the polymer precipitation which results in formation of micropores. Thus, it can be said that the addition of a glycol greatly contributes to the formation of a hollow fiber membrane with an Ai B Ao-composed three layer structure which is excellent in water permeability as well as in burst strength.

As preferred examples of a glycol to be used in the process of the present invention, there can be mentioned ethylene glycol, diethylene glycol, triethylene glycol, tetraethylene glycol, polyethylene glycol (having a number average molecular weight of 200 to 6,000), propylene glycol, dipropylene glycol, tripropylene glycol, polypropylene glycol (having a number of average molecular weight of 200 to 6,000), glycerin, trimethylolpropane, polytetraethylene glycol, ethylene glycol methyl ether derivatives such as ethylene glycol monomethyl ether, ethylene glycol dimethyl ether, diethylene glycol monomethyl ether, diethylene glycol dimethyl ether, triethylene glycol monomethyl ether and propylene glycol derivatives such as propylene glycol monomethyl ether or the like. These glycols as mentioned just above may be used alone or in combination. Of them, a glycol having a number average molecular weight similar to that of tetraethylene glycol is especially preferred. The proportion of the glycol to the resin solution is not critical in so far as the state of the resin solution in which the resin is uniformly dissolved can be maintained. Such a proportion may be varied depending upon, for example, the resin concentration of the solution and the kind of the polar solvent employed, but usually a glycol is incorporated in an amount of 0.5 to 30% by weight based on the total weight of the spinning solution. When the glycol content is less than 0.5% by weight, there can hardly be expected the desired effect of the glycol on the formation of a hollow fiber membrane. When the glycol content exceeds 30% by weight, the resin solution becomes instable and opaque and, in addition, the membrane-forming performance of the spinning solution is so lowered that there cannot be obtained a hollow fiber membrane with excellent properties.

The concentration of the resin in the spinning solution is in the range of from 10 to 35% by weight based on the total weight of the spinning solution, preferably from 15 to 30% by weight, more preferably 18 to 25% by weight. When the concentration of the resin exceeds 35% by weight, the resulting semipermeable membrane is so poor in water permeability that it cannot be put to practical use. In contrast, when the resin concentration is lower than 10% by weight, the resulting membrane is so poor in mechanical strength that it cannot be put to practical use.

In the process of the present invention, metal salts such as $LiCl$, $LiNO_3$, $CaCl_2$ and $MgCl_2$ may be added to the spinning solution to increase the solubility of the polysulfone resin in the solvent for the resin. The metal salt may be employed in an amount of 5% by weight or less based on the amount of the spinning solution.

In preparing a hollow fiber, a coagulating liquid must be employed as the internal and external coagulating liquids so that coagulation of both of the outside and the inside of the extrudate in the form of a hollow fiber is performed.

As the coagulating liquid, water is most generally used. However, there may also be employed an organic solvent which is incapable of dissolving the resin. Examples of such an organic solvent include methanol, ethanol, dioxane, cyclohexanol, benzene, toluene, xylene, petroleum oil and the like. These non-solvents may be employed alone or in mixture. It is preferred that the internal coagulating liquid and the external coagulating liquid be the same.

The temperature of each of the spinning solution and the coagulating liquid is not critical, but generally, the temperature of the spinning solution is in the range of −100° C. to 140° C., preferably −20° to 70° C., and the temperature of the coagulating liquid is in the range of −100° to 100° C., preferably 0° to 80° C.

In practicing the process of the present invention, a spinning solution of an aromatic polysulfone type resin in an organic polar solvent for said resin is extruded from an annular spinning nozzle which is provided with a resin-extruding annular orifice while simultaneously injecting as internal coagulating liquid a liquid miscible with said organic polar solvent but incapable of dissolving the polysulfone type resin into the annular spinning nozzle at an inside bore thereof, thereby to obtain an extrudate in the form of a hollow fiber, and the extrudate thus obtained is introduced into an external coagulating liquid comprising a liquid miscible with said organic polar solvent but incapable of dissolving the polysulfone type resin. In the process of the present invention, the extrudate in the form of a hollow fiber may be directly introduced into the external coagulating liquid. However, in order to enhance the water permeability of the membrane without adversely affecting the burst strength, it is advantageous that the extrudate is, before being introduced into the external coagulating liquid, allowed to run 25 cm or less, preferably 15 cm or less, in an air space. The distance which the extrudate is allowed to run is defined as a distance between the tip of the spinning nozzle and the surface of the external coagulating liquid, and hereinafter will be abbreviated as the "running-in-air distance". If the running-in-air distance exceeds 30 cm, the resulting hollow fiber membrane is caused to have a structure in which voids open to the outer surface of the membrane, or, have a structure in which the outer surface skin layer has an extremely small thickness. In case the running-in-air distance is 15 cm or less, it is desired that the resin concentration of the spinning solution is in the range of 10 to 35 wt%. On the other hand, when the running-in-air distance is 15 to 25 cm, it is desired that the resin concentration of the spinning solution is in the range of 15 to 35 wt%.

In order to obtain a hollow fiber membrane with a three-layer structure characteristic of the present invention, it is crucially important to control the membrane thickness. As mentioned in the foregoing, the hollow fiber membrane of the present invention has a membrane thickness of as small as less than 100 μm. A hollow fiber membrane having a thickness exceeding 100 μm is poor in water permeability, even if it has a three-layer structure, due to the presence of thick surface skin layers which causes an increase of the permeation resistance of the membrane.

According to the process of the present invention, the spinning solution is extruded from an annular spinning nozzle which is provided with a resin-extruding annular orifice having an orifice width of 10 to 100 μm as measured on the resin-extruding side of the nozzle. The thickness of the hollow fiber membrane is varied according to the orifice width of the annular spinning nozzle, and is not greatly affected by other spinning conditions. Usually, the membrane thickness is smaller than the orifice width of the nozzle. Accordingly, in order to obtain a hollow fiber membrane having a membrane thickness of as small as less than 100 μm, it is required to employ a spinning nozzle of which the orifice width is in the range of 10 to 110 μm.

As mentioned in the foregoing, the hollow fiber membrane of the present invention has a thickness as small as less than 100 μm and exhibits an extremely excellent water permeability. Further, the present hollow fiber membrane has, in spite of such a small membrane thickness, a high burst strength. Therefore, the hollow fiber membrane has a wide variety of prospective uses, and can advantageously be used especially in the applications where the use of a fine and thin hollow fiber having a high water permeability as well as a high burst strength is desired.

The present invention will now be illustrated in more detail by the following Examples that should not be construed as limiting the scope of the invention.

In Examples, the water permeability, the cut-off molecular weight, the burst strength and the average pore diameter and the maximum pore diameter of pores present in the surface skin layer of the aromatic polysulfone type resin hollow fiber membrane were determined by the following methods.

(1) Measurement of the water permeability

A predetermined number of hollow fibers whose outer and inner diameters have been measured in advance are bundled into a module and one end of said module is sealed. Water is injected from the other end of said module at which the hollow fibers are unified by means of an adhesive. The effective length of the module is 25 cm and the difference in pressure between the inside and the outside of the hollow fiber is 1 atm. Under such conditions, the permeability ($m^3/m^2$.day.atm) of the hollow fiber to a 25° C. distilled water is measured.

(2) Measurement of the cut-off molecular weight

One end of a hollow fiber of which the outer and inner diameters have been measured in advance is used as an inlet for water and the other end of said hollow fiber is used as an outlet for water. The effective length of the fiber is 25 cm, the pressure at the inlet portion is 1.2 kg/cm² or less, the pressure at the outlet portion is 0.8 kg/cm² or more, the average of the pressure in the inlet and outlet portions is 1.0 kg/cm² and the linear velocity of the water is 1.0 m/sec. Under such conditions, aqueous solutions of various molecules are, at a temperature of 25° C., introduced into said fiber from the inlet portion thereof. After 10 minutes, 0.5 ml of the filtrate is taken, and the proportions cut-off of various molecules are calculated from the amount of molecules contained therein. When the proportion cut-off of dextran molecules is determined, use is made of an aqueous 5.0 wt % solution thereof. On the other hand, when the proportion cut-off of a globular protein is determined, use is made of an aqueous 0.25 wt% solution thereof. In latter case, the hollow fiber should be, prior to injection of the solution, dipped into the said solution (5° C.) for 12 hours so that the hollow fiber is not adversery affected by adsorption of the protein.

(3) Measurement of the burst strength

A hollow fiber is bended in the form of a loop, and the both ends thereof are fixed. Pneumatic pressure is equally applied to the hollow fiber from each of the ends of the hollow fiber thus fixed, and thereafter, the pressure is gradually raised at an elevation rate of 10 kg/cm²/min. The burst strength is defined as a pressure at which the hollow fiber ruptures.

(4) Measurement of the average pore diameter and the maximum pore diameter of pores (Cp pores and Up pores) present in the surface skin layers (i) Cp pores: In a scanning electron photomicrograph (magnification: $\times 10^3$ to $10^4$), 500 pores are arbitrarily selected from pores shown in said photomicrograph. The diameter of each of the thus selected pores is measured, thereby to obtain 500 values with respect to the pore diameter. The average pore diameter of Cp pores is defined as the arithmetical average of the thus obtained 500 values.

The maximum diameter of Cp pores is defined as a diameter of the pore of which the diameter is largest among at least 1,000 pores arbitrarily selected from the pores shown in the above-mentioned photomicrograph.

(ii) Up pores: A scanning electron photomicrograph showing an enlarged ($\times 10^3$ to $10^4$) view of the surface of the membrane is prepared. On the thus prepared photomicrograph, 30 straight lines are arbitrarily drawn in such a manner that approximately 10 to 50 pores are crossed by each straight line. In this photomicrograph, with respect to each of 30 straight lines drawn thereon, measured are the following:

(1) number of pores (n) crossed by the straight line; and
(2) distance between two points on the periphery of a pore, at each of which the straight line intersects the periphery of the pore (the distance measurement should be made to the order of $10^{-2}$ in terms of micron in real length).

The distance as defined above is measured with respect to all the pores crossed by the straight line, and the total (d) of the measured distance values is obtained with respect to each of 30 straight lines.

As a result, 30 values with respect to (n) and 30 values with respect to (d) are obtained. Then, 30 values for (n) and 30 values for (d) are separately added together, whereby the grand total of (n) and the grand total of (d) are respectively obtained, and referred to as (N) and (D), respectively. The average pore diameter of Up pores is defined as the value of (D/N).

The maximum pore diameter of Up pores is determined by the same process as used for the measurement of the maximum pore diameter of Cp pores. However, in place of the "diameter" used in the case of Cp pores, there is used, in the case of Up pores, the average value of the length of "major axis" and the length of "minor axis" of the pore. The terms "major axis" and "minor axis" of the Up pore are respectively defined as follows:

From a plurality of straight lines each passing across a pane and each having their respective end portions lying on the periphery of the pore, selected is a straight line of which the length is largest. The major axis of the Up pore is defined as the straight line having the largest length as mentioned above. The inner axis of the Up pore is defined as the straight line perpendicular to the major axis and passing the midpoint of the major axis, and having its end portions lying on the periphery of the pore. EXAMPLE 1

Dimethylacetamide (hereinafter often abbreviated as "DMAc") as a solvent, tetraethylene glycol (hereinafter often abbreviated as "TEG") as an additive and Udel polysulfone ® (trademark of a polysulfone manufactured and sold by Union Carbide Corp., U.S.A.) comprising recurring units represented by the formula:

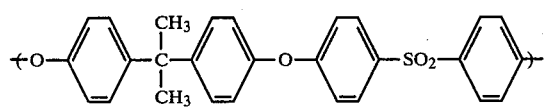

as an aromatic polysulfone type resin were mixed in a weight ratio of 71:9:20 to obtain a homogeneous resin solution. The thus obtained resin solution was used as a spinning solution. The spinning solution of 30° C. was extruded from an annular hollow fiber spinning nozzle [provided with a resin-extruding annular orifice having an orifice width of 45 μm]. Purified water of 30° C. was used as internal and external coagulating liquids to effect coagulation of both the inside and outside of the resulting extrudate. As a result, there was obtained a porous membrane in the form of a hollow fiber having an inner diameter of 200 μm, an outer diameter of 276 μm and a membrane thickness of 38 μm. The distance between the tip of the spinning nozzle and the surface of the external coagulating liquid (hereinafter abbreviated as "running-in-air distance") was 1.5 cm.

The thus obtained hollow fiber had the following properties: water permeability, 22 m³/m².day.atm.water at 25° C.; burst strength, 20 kg/cm². The proportion cut-off of ovalbumin which is a globular protein and has a molecular weight of 45,000 was 90% or more, and the proportion cut off of dextran T-500 (molecular weight: 500,000) was 53% or more.

Figure 11:
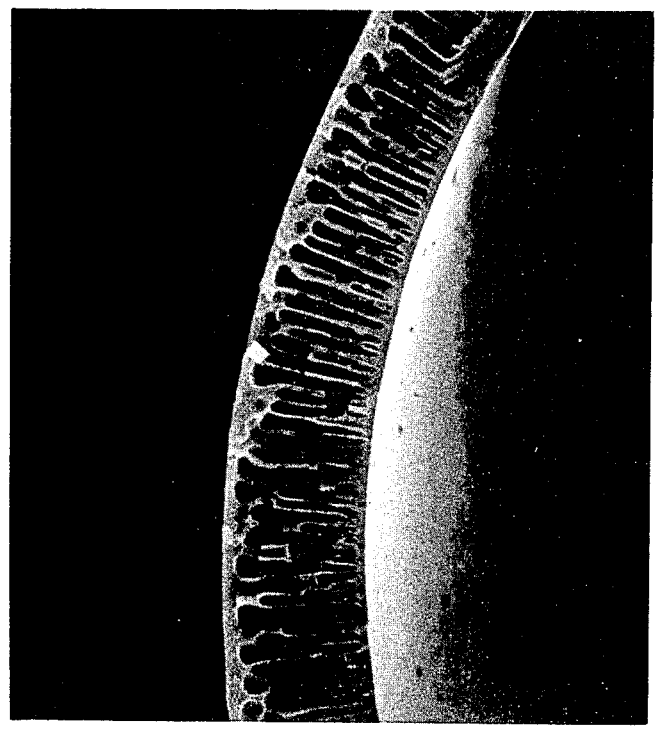
FIG. 11 is a scanning electron photomicrograph (magnification: ×670) showing a freeze-broken cross section of a hollow fiber membrane obtained in Example 1 as will be given later.
Figure 12:
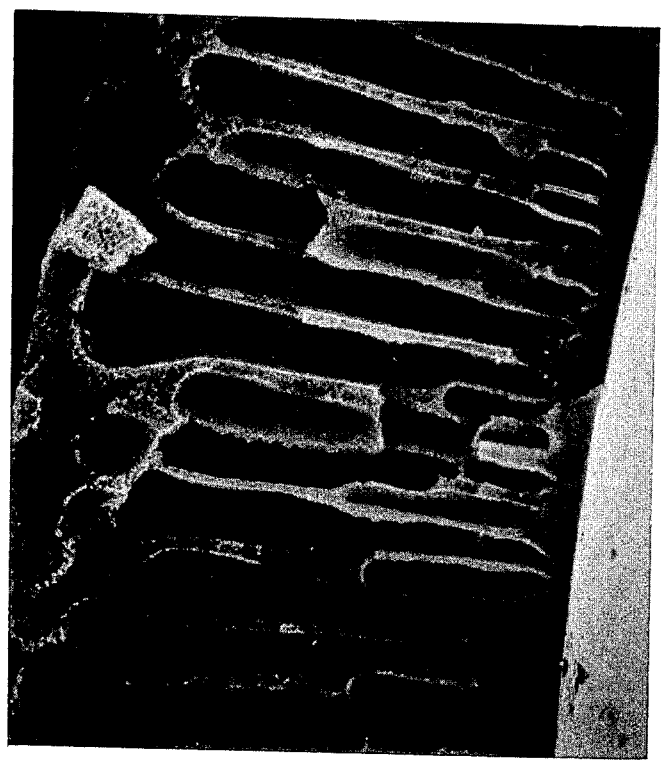
FIG. 12 is a scanning electron photomicrograph (magnification: ×3000) showing an enlarged view of the cross section shown in FIG. 11.

The scanning electron photomicrograph (magnification: $\times 670$) of a freeze-broken entire cross section of the resulting hollow fiber membrane is shown in FIG. 11. FIG. 12 is a scanning electron photomicrograph (magnification: $\times 3000$) showing an enlarged view of a portion of the cross section shown in FIG. 11. From FIG. 11 and FIG. 12, it is seen that the hollow fiber membrane has a three-layer structure (Ao B Ai) characteristic of the present invention. Observation of the photomicrograph (magnification: $\times 1000$ to $10000$) of an entire cross section of the hollow fiber membrane showed that the thickness of the Ai layer was about 1.7 μm and that of the Ao layer was about 3.3 μm.

By the examination of both surfaces of the hollow fiber membrane using a scanning electron photomicrograph (magnification: $\times 10000$), the pores present in the Ai layer were so small that they could not be observed, but it is confirmed that, in the Ao layer, there were formed Cp pores having an average pore diameter of 0.10 μm and a maximum pore diameter of 0.20 μm.

EXAMPLES 2 to 7 AND COMPARATIVE EXAMPLE 1

Hollow fiber membranes were prepared in substantially the same manner as in Example 1 except that the orifice width of the spinning nozzle was varied as indicated in Table 1. As a result, hollow fiber membranes differing in membrane thickness were obtained. The properties of the resulting hollow fiber membranes were examined and the results obtained are shown in Table 1. A hollow fiber membrane obtained in Comparative Example 1 did not have a three-layer structure but had a five-layer structure of an outer surface layer, an outer void layer, an intermediate layer, an inner void layer and an inner surface layer arranged in that sequence. In the hollow fiber membrane of five-layer structure, the thicknesses of the outer and inner void layers were largely different from each other, and the voids present in the outer void layer vary in length widely.

Figure 9:
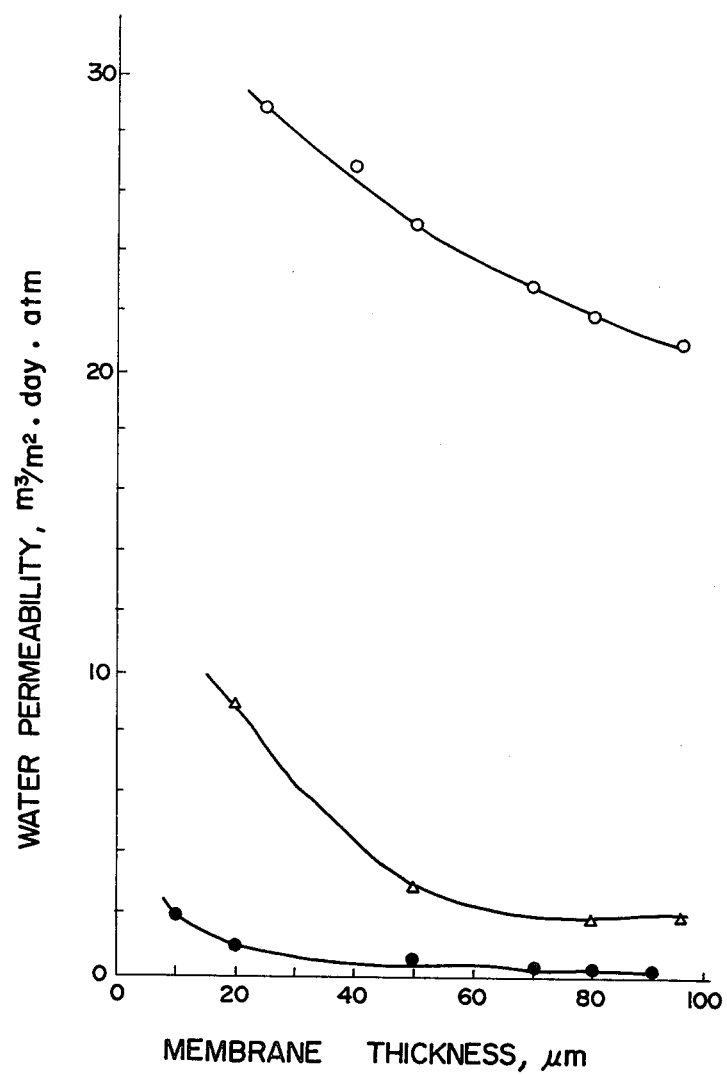
FIG. 9 is a graph showing the relationship between the membrane thickness and the water permeability of the hollow fiber membranes obtained in Examples 2 to 7 as will be given later, shown in comparison with that of hollow fiber membranes obtained in Comparative Examples 3 to 6 as will be given later and that of flat membranes obtained in Comparative Examples 8 to 13 as will be given later.

With respect to the hollow fiber membranes obtained in Examples 2 to 7, the relationship between the membrane thickness and the water permeability was examined and the results obtained are shown in FIG. 9. In FIG. 9, a curve —o— obtained from the data on hollow fibers obtained in Examples 2 to 7, a curve —∆—was obtained from the data on hollow fibers obtained in Comparative Examples 3 to 6 as will be given later and a curve —●— was obtained from the data on flat membranes obtained in Comparative Examples 8 to 13 as will be given later.

Figure 10:
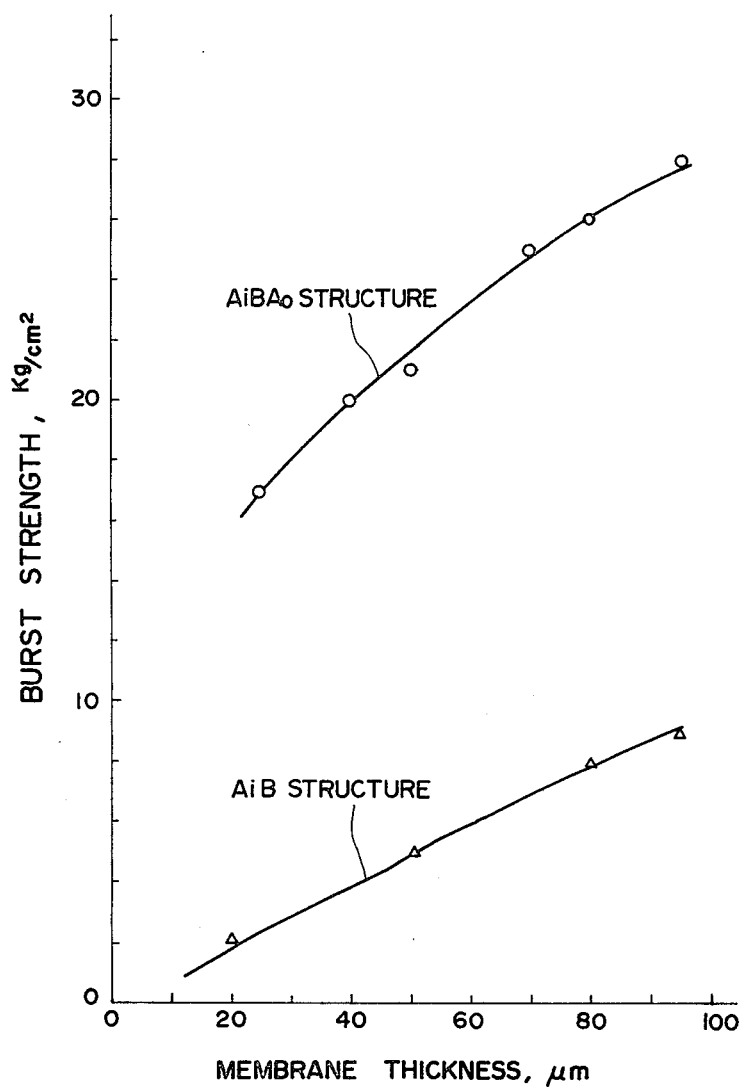
FIG. 10 is a graph showing the relationship between the membrane thickness and the burst strength of hollow fiber membranes obtained in Examples 2 to 7 as will be given later, shown in comparison with that of hollow fiber membranes obtained in Comparative Examples 3 to 6 as will be given later.

The relationship between the membrane thickness and the burst strength of the hollow fiber membranes obtained in Examples 2 to 7 is shown in FIG. 10 in comparison with that of hollow fiber membranes obtained in Comparative Examples 3 to 6 as will be given later. In FIG. 10, a curve —o— was obtained from the data on hollow fiber membranes obtained in Examples 2 to 7 and a curve —Δ13 was obtained from the data on hollow fiber membranes obtained in Comparative Examples 3 to 6.

tacted with the external coagulating liquid, washed in a 80° C. water bath.

Each of the hollow fiber membranes obtained in Examples 8 and 9 had a three-layer structure characteristic of the present invention.

TABLE 1

| Example No. | Orifice width, μm | Outer diameter, μm | Inner diameter, μm | Membrane thickness, μm | Water*1 permeability | Burst strength, kg/cm² | $A_i$ layer | | | |
|---|---|---|---|---|---|---|---|---|---|---|
| | | | | | | | Thickness, μm | Kind of pores | pores*2 Average pore diameter, μm | Maximum pore diameter, μm |
| 2 | 30 | 550 | 500 | 25 | 29 | 17 | 1.8 | Np | — | — |
| 3 | 45 | 580 | 500 | 40 | 27 | 20 | 1.7 | Np | — | — |
| 4 | 55 | 600 | 500 | 50 | 25 | 21 | 1.8 | Np | — | — |
| 5 | 80 | 640 | 500 | 70 | 23 | 25 | 1.8 | Np | — | — |
| 6 | 90 | 660 | 500 | 80 | 22 | 26 | 1.8 | Np | — | — |
| 7 | 105 | 690 | 500 | 95 | 21 | 28 | 1.8 | Np | — | — |
| Comparative Example 1 | 180 | 800 | 500 | 150 | 2.5 | 32 | 1.8 | Np | — | — |

| Example No. | $A_o$ layer | | | | Cut-off molecular weight | |
|---|---|---|---|---|---|---|
| | Thickness, μm | Kind of pores | pores*2 Average pore diameter, μm | Maximum pore diameter, μm | Kind of protein employed | Molecular Weight |
| 2 | 1.8 | Cp | 0.10 | 0.25 | Bovine serum albumin | 67000 |
| 3 | 2.5 | Cp | " | " | Bovine serum albumin | 67000 |
| 4 | 3.0 | Cp | " | " | Ovalbumin | 45000 |
| 5 | 3.2 | Cp | " | " | Trypsinogen | 24000 |
| 6 | 3.5 | Cp | " | " | Lysozyme | 14000 |
| 7 | 4.0 | Cp | " | 2.00 | Cytochrome C | 13000 |
| Comparative Example 1 | 10.0 | Np | — | — | Insulin | 6000 |

Note:
*1Water permeability: m³/m² · day · atm · water at 25° C.
*2Average pore diameter and maximum pore diameter were measured by means of a scanning electron photomicrograph (magnification: × 1000 to 10000)

EXAMPLES 8 AND 9 AND COMPARATIVE EXAMPLE 2

In Example 8, the same resin solution as employed in Example 1 was extruded from an annular hollow fiber spinning nozzle having an orifice width of 90 μm. Purified water was used as internal and external coagulating liquids, thereby to effect coagulation of both the inside and outside of the resulting extrudate. The temperatures of the internal coagulating liquid and the external coagulating liquid were 30° C. and 50° C., respectively. The running-in-air distance was 0 cm.

Figure 13:
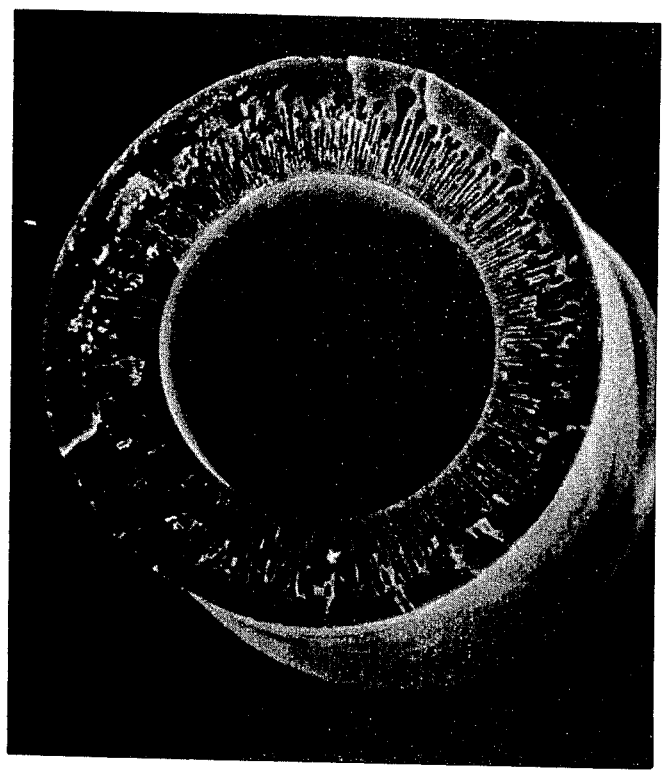
FIG. 13 is a scanning electron photomicrograph (magnification: ×150) of a freeze-broken entire cross section of a hollow fiber membrane obtained in Comparative Example 2 as will given later.
Figure 14:
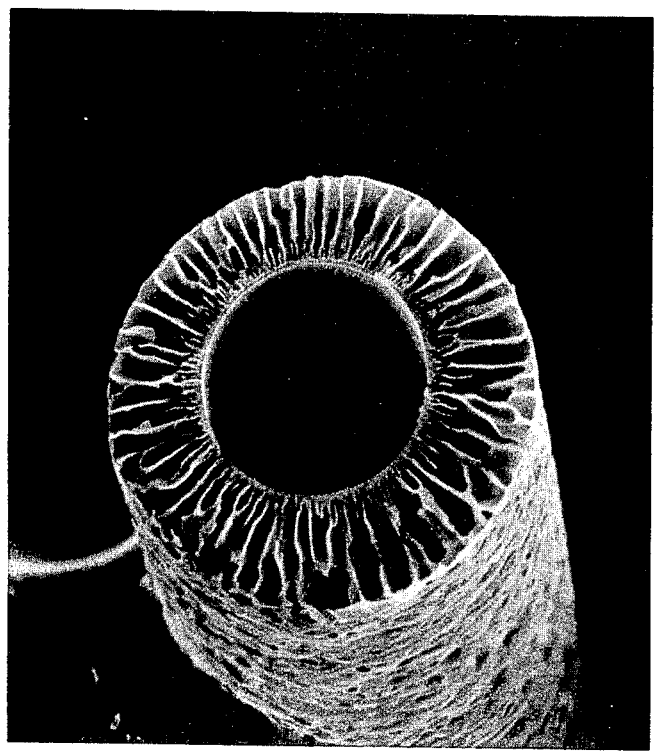
FIG. 14 is a scanning electron photomicrograph (magnification: ×125) of a freeze-broken entire cross section of a hollow fiber membrane with a double-layer structure obtained in Comparative Example 6 as will given later.
Figure 15:
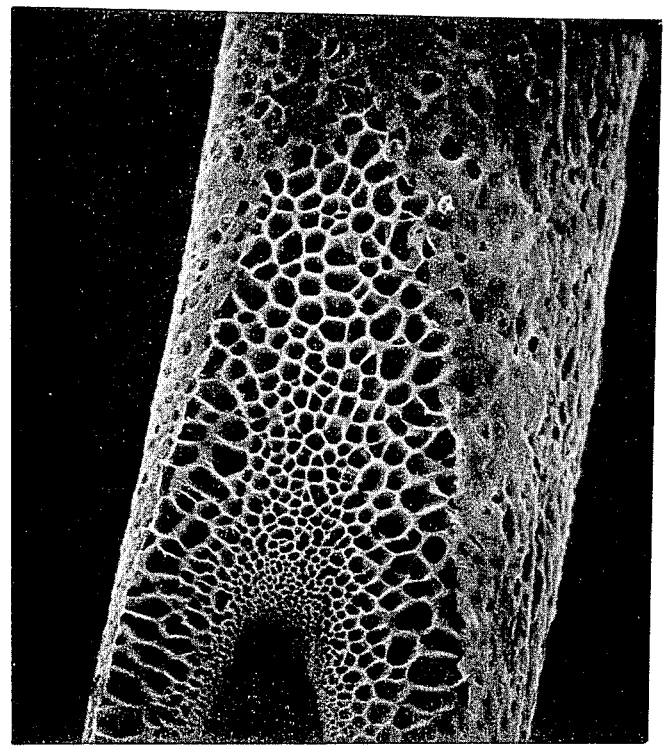
FIG. 15 is a scanning electron photomicrograph (magnification: ×125) of a freeze-broken oblique cross section of the hollow fiber membrane shown in FIG. 14.

In Example 9, a hollow fiber membrane was prepared in substantially the same manner as in Example 8 except that kerosene of 30° C. in temperature was used as the external coagulating liquid instead of the purified water and that the resulting extrudate was, after being con- A comparative hollow fiber membrane was prepared in substantially the same manner as in Example 9 except that the orifice width of the nozzle was changed to 150 μm. The resulting hollow fiber membrane had a three-layer structure, but the thickness of the membrane was 140 μm. The scanning electron photomicrograph of a freeze-broken cross section of this comparative hollow fiber membrane is given in FIG. 13.

The properties of each of the hollow fiber membranes obtained in Examples 8, 9 and Comparative Example 2 were examined and the results obtained are shown in Table 2. It is apparent from the results that the hollow fiber membrane (membrane thickness: 140 μm) obtained in Comparative Example 2 is extremely poor in water permeability, as compared with the hollow fiber membranes obtained in Examples 8 and 9.

TABLE 2

| Example No. | Inner diameter, μm | Outer diameter, μm | Membrane thickness, μm | Water permeability*1 | Burst Strength, kg/cm² | $A_i$ layer | | | |
|---|---|---|---|---|---|---|---|---|---|
| | | | | | | Thickness, μm | kind of pores | pores*2 Average pore diameter, μm | Maximum pore diameter, μm |
| 8 | 500 | 660 | 80 | 11.0 | 31 | 1.8 | Np | — | — |
| 9 | 500 | 660 | 80 | 10.0 | 30 | 1.8 | Np | — | — |
| Comparative Example 2 | 420 | 700 | 140 | 2.0 | 35 | 1.8 | Np | — | — |

Cut-off molecular

TABLE 2-continued

| Example No. | A₀ layer thickness, μm | pores*2 kind of pores | Average pore diameter, μm | Maximum pore diameter, μm | Kind of protein employed | weight Molecular weight |
|---|---|---|---|---|---|---|
| 8 | 4.0 | Np | — | — | Insulin | 6000 |
| 9 | 9.0 | Cp | 0.20 | 0.40 | Lysozyme | 14000 |
| Comparative Example 2 | 65 | Cp | 0.20 | 0.50 | Lysozyme | 14000 |

Note:
*1Water permeability: m³/m² · day · atm · water at 25° C.
*2Average pore diameter and maximum pore diameter were measured by means of a scanning electron photomicrograph (magnification: × 1000 to 10000)

COMPARATIVE EXAMPLES 3 TO 6

The same resin solution as employed in Example 1 was extruded from annular hollow fiber spinning nozzles differing in orifice width (orifice width: 50 μm, 100 μm, 150 μm and 200 μm), thereby to obtain hollow fiber membranes having various membrane thicknesses. Purified water was used as the internal coagulating liquid, but, the external coagulating liquid was not employed.

Each of the resulting hollow fiber membranes was 500 μm in inner diameter and had an Ai B-composed double-layer structure in which the voids present in the B layer open to the outer surface of the membrane.

With respect to the hollow fiber membranes obtained in Comparative Examples 3 to 6, the relationship between the membrane thickness and the water permeability is shown in FIG. 9 and indicated by a curve —△—, and the relationship between the membrane thickness and the burst strength is shown in FIG. 10 and indicated by a curve —△—.

COMPARATIVE EXAMPLE 7

The same resin solution as used in Example 1 was subjected to T-die extrusion to form a flat membrane, and the resulting membrane was dipped into a purified water to effect coagulation of the membrane. As a result, a flat membrane of 100 μm in thickness and having an Ai B Ao-composed three-layer structure was obtained. The resulting flat membrane had an extremely poor water permeability (0.01 m³/m²·day·atm·water at 25° C.) and, hence, it was of little practical use.

EXAMPLE 10

Dimethylacetamide (DMAc) as the solvent, tetraethylene glycol (TEG) as the additive and VICTREX (trade name of a polyether sulfone manufactured and sold by ICI Company, England) comprising recurring units represented by the formula:

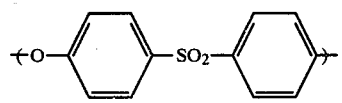

as the aromatic polysulfone type resin were mixed in a weight ratio of 65:15:20 to obtain a homogeneous resin solution. The thus obtained resin solution was used as the spinning solution. The spinning solution of 30° C. was then extruded from an annular hollow fiber spinning nozzle having an orifice width of 55 μm. Purified water of 30° C. was used as the internal and external coagulating liquids to effect coagulation of both the inside and outside of the resulting extrudate. As a result, there was obtained a porous membrane in the form of a hollow fiber having an inner diameter of 500 μm, an outer diameter of 600 μm and a membrane thickness of 50 μm. The running-in-air distance, which is a distance between the tip of the spinning nozzle and the surface of the external coagulating liquid was 3.0 cm.

The thus obtained hollow fiber had following properties: water permeability, 30 m³/m²·day·atm·water at 25° C.; burst strength, 23 kg/cm². The proportion cut-off of insulin (molecular weight: 6000) was 90% or more. The resulting hollow fiber membrane had an Ai B Ao-composed three-layer structure characteristic of the present invention. By the examination of both surfaces of the hollow fiber membrane using a scanning electron photomicrograph (magnification: ×10,000), the pores present in the Ai layer were so small that they could not be observed, but it was confirmed that, in the Ao layer, there were formed Cp pores having an average pore diameter of 0.07 μm and a maximum pore diameter of 0.15 μm.

COMPARATIVE EXAMPLES 8 TO 13

The same resin solution as used in Example 1 was cast, at a temperature of 30° C., with doctor blades differing in thickness onto a glass plate to form membranes having various thicknesses. Each of the thus formed membranes was then dipped into a 30° C. purified water to effect coagulation of the membrane. As a result, there were obtained flat membranes having thicknesses of 10 μm, 20 μm, 50 μm, 70 μm, 80 μm and 90 μm, respectively.

With respect to the resulting flat membranes, the relationship between the membrane thickness and the water permeability is shown in FIG. 9 and indicated by a curve —⊕—.

COMPARATIVE EXAMPLE 14

The same polysulfone as employed in Example 1, DMAc as the solvent and TEG as the additive were mixed in a weight ratio of 16:75:9 to obtain a homogeneous resin solution. The thus obtained resin solution was cast, at a temperature of 30° C., with a doctor blade onto a glass plate to form a membrane, and the membrane was then dipped into a 30° C. purified water to effect coagulation of the membrane. The resulting flat membrane was 40 μm in thickness and had a three-layer structure. The water permeability of this flat membrane was as small as 0.2 m³/m²·day·atm·water at 25° C.

EXAMPLES 11 TO 20

Hollow fibers were prepared in substantially the same manner as in Example 1 except that the kind of the additive was varied as indicated in Table 3. The additives employed and the properties of the resulting hollow fibers are shown in Table 3. Observation of a cross section of each of the thus obtained hollow fibers showed that each hollow fiber had a three-layer structure characteristic of the present invention. Each of the resulting hollow fibers was 500 μm in inner diameter, 600 μm in outer diameter and 50 μm in membrane thickness.

using internal and external coagulating liquids as indicated in Table 4. The temperature of the coagulating liquid was 30° C. The running-in-air distance was 0 cm. Each of the hollow fiber membranes obtained in Example 21 and 22 was 500 μm in inner diameter, 610 μm in outer diameter and 55 μm in membrane thickness. The hollow fiber membrane obtained in Example 23 was 500 μm in inner diameter, 600 μm in outer diameter and 50 μm in membrane thickness. The properties of each of the resulting hollow fiber membranes were examined and the results obtained are shown in Table 4.

TABLE 3

| Example No. | Additive | Burst strength, kg/cm² | Water*1 permeability | $A_i$ layer Thickness, μm | Pores*3 Kind of pores | Pores*3 Average pore diameter, μm | Pores*3 Maximum pore diameter, μm | $A_o$ layer Thickness, μm | Pores*3 Kind of pores | Pores*3 Average pore diameter, μm | Pores*3 Maximum pore diameter, μm |
|---|---|---|---|---|---|---|---|---|---|---|---|
| 11 | ethylene glycol | 21 | 20 | 2.0 | Np | — | — | 5 | Cp | 0.05 | 0.10 |
| 12 | diethylene glycol | 21 | 21 | 2.0 | " | — | — | 4 | Cp | 0.05 | 0.10 |
| 13 | triethylene glycol | 21 | 21 | 2.0 | " | — | — | 5 | Cp | 0.08 | 0.15 |
| 14 | ethylene glycol/LiCl | 21 | 26 | 1.8 | " | — | — | 2 | Cp | 0.10 | 0.20 |
| 15 | polyethylene glycol 200*2 | 20 | 28 | 1.8 | " | — | — | 5 | Cp | 0.10 | 0.30 |
| 16 | polyethylene glycol 6000*2 | 18 | 32 | 1.5 | " | — | — | 8 | Up | 0.40 | 0.70 |
| 17 | propylene glycol | 20 | 28 | 1.8 | " | — | — | 2 | Cp | 0.10 | 0.20 |
| 18 | dipropylene glycol | 20 | 28 | 1.8 | " | — | — | 2 | Cp | 0.10 | 0.30 |
| 19 | polypropylene glycol 1000*2 | 20 | 30 | 1.0 | " | — | — | 6 | Cp | 0.30 | 0.50 |
| 20 | polypropylene glycol 3000*2 | 17 | 33 | 1.0 | " | — | — | 7 | Up | 0.40 | 0.70 |

| Example No. | Cut-off molecular weight Kind of protein employed | Cut-off molecular weight Molecular weight | Remarks |
|---|---|---|---|
| 11 | Ovalbumin | 45000 | |
| 12 | " | 45000 | |
| 13 | " | 45000 | |
| 14 | Trypsinogen | 24000 | |
| 15 | Ovalbumin | 45000 | |
| 16 | β-Galactose DH | 95000 | Proportion cut-off of bovine serum albumin, (molecular weight: 67000) was 25% or more |
| 17 | Ovalbumin | 45000 | |
| 18 | " | 45000 | |
| 19 | Bovine serum albumin | 67000 | |
| 20 | β-Galactose DH | 95000 bovine serum albumin | Proportion cut-off of (molecular weight: 67000) was 25% or more |

Note:
*1Water permeability: m³/m² · day · atm · water at 25° C.
*2Molecular weight
*3Average pore diameter and maximum pore diameter were measured by means of a scanning electron photomicrograph (magnification: × 1000 to 10000)

EXAMPLES 21 TO 23

The same resin solution as used in Example 1 was extruded, at a temperature of 30° C., from annular hollow fiber spinning nozzles having orifice widths of 60 μm (Examples 21 and 22) and 55 μm (Example 23). Coagulation of the resulting extrudate was effected by

EXAMPLE 24

A hollow fiber membrane was prepared in the same manner as in Examples 21 to 22 except that a 50% aqueous DMAc solution of 30° C. was used as internal and external coagulating liquids and 10 cm of the running-in-air distance was employed. The properties of the resulting hollow fiber membrane were examined and the results obtained are shown in Table 4.

TABLE

| Example No. | Internal coagulating liquid | External coagulating liquid | Water*¹ permeability | Burst strength, kg/cm² | $A_i$ layer Thickness, μm | Kind of pores | Pores*³ Average pore diameter, μm | Maximum pore diameter, μm |
|---|---|---|---|---|---|---|---|---|
| 21 | H₂O | 50% aq.*² DMAc Soln. | 30 | 22 | 2.0 | Np | — | — |
| 22 | 50% aq.*² DMAc Soln. | 50% aq.*² DMAc Soln. | 32 | 17 | 2.3 | Cp | 0.10 | 0.20 |
| 23 | 50% aq.*² DMAc Soln. | H₂O | 30 | 20 | 2.0 | Cp | 0.10 | 0.20 |
| 24 | 50% aq.*² DMAc Soln. | 50% aq.*² DMAc Soln. | 33 | 17 | 2.0 | Np | — | — |

| Example No. | $A_o$ layer Thickness, μm | Kind of pores | Pores*³ Average pore diameter, μm | Maximum pore diameter, μm | Cut-off molecular weight Kind of protein employed | Molecular weight | Remarks |
|---|---|---|---|---|---|---|---|
| 21 | 2.2 | Cp | 0.10 | 0.20 | Ovalbumin | 45000 | |
| 22 | 2.2 | Cp | 0.10 | 0.20 | Bovine serum albumin | 67000 | |
| 23 | 1.8 | Np | — | — | Ovalbumin | 45000 | |
| 24 | 8 | Cp | 0.30 | 0.50 | β-Galactose DH | 95000 | Proportion cut-off of bovine serum albumin (molecular weight: 67000) was 25% or more |

Note:
*¹Water permeability m³/m² · day · atm · water at 25° C.
*²A 50% aqueous DMAc solution
*³Average pore diameter and maximum pore diameter were measured by means of a scanning electron photomicrograph (magnification: × 1000 to 10000)

EXAMPLES 25 TO 34 AND COMPARATIVE EXAMPLE 15

Hollow fiber membranes were prepared in substantially the same manner as in Example 1 except that the orifice width of the nozzle and the running-in-air distance were varied as indicated in Table 5. The inner diameter of each of the resulting hollow fiber membranes was adjusted to 500 μm. The properties of each of the resulting hollow fiber membranes were examined and the results obtained are shown in Table 5.

A hollow fiber membrane obtained in Comparative Example 5 (running-in-air distance: 30 cm) had a double-layer structure in which pores having an average pore diameter of 1.00 μm and a maximum pore diameter of 2.50 μm were present in the Ao layer. As shown in Table 5, the hollow fiber membrane obtained in Comparative Example 15 was poor in burst strength as compared with the hollow fiber membranes of the present invention.

TABLE 5

| Example No. | Running-in-air distance, cm | Orifice width, μm | Membrane thickness, μm | Burst strength, kg/cm² | Water*¹ permeability | $A_i$ layer Thickness, μm | Kind of pores | Pores*² Average pore diameter, μm | Maximum pore diameter, μm |
|---|---|---|---|---|---|---|---|---|---|
| 25 | 20 | 110 | 75 | 15 | 20 | 2.3 | Np | — | — |
| 26 | 15 | 90 | 60 | 15 | 25 | 2.2 | " | — | — |
| 27 | 10 | 70 | 55 | 15 | 25 | 2.0 | " | — | — |
| 28 | 7 | 60 | 50 | 15 | 26 | 2.0 | " | — | — |
| 29 | 5 | 60 | 50 | 16 | 25 | 2.2 | " | — | — |
| 30 | 3 | 70 | 50 | 16 | 23 | 2.3 | " | — | — |
| 31 | 2 | 70 | 60 | 18 | 22 | 2.3 | " | — | — |
| 32 | 1.5 | 70 | 65 | 25 | 23 | 1.8 | " | — | — |
| 33 | 1.0 | 70 | 60 | 26 | 20 | 1.8 | " | — | — |
| 34 | 0 | 70 | 65 | 25 | 20 | 2.0 | " | — | — |
| Comparative Example 15 | 30 | 100 | 60 | 7 | 38 | 2.0 | " | — | — |

| Example No. | $A_o$ layer Thickness, μm | Kind of pores | Pores*² Average pore diameter, μm | Maximum pore diameter, μm | Cut-off molecular weight Kind of protein employed | Molecular weight |
|---|---|---|---|---|---|---|
| 25 | 1.0 | Up | 0.50 | 0.80 | Ovalbumin | 45000 |
| 26 | 2.0 | Up | 0.40 | 0.70 | Trypsinogen | 24000 |
| 27 | 3.0 | Up | 0.40 | 0.60 | " | " |
| 28 | 4.0 | Cp | 0.20 | 0.40 | " | " |
| 29 | 3.0 | Cp | 0.18 | 0.35 | " | " |

TABLE 5-continued

| | | | | | | |
|---|---|---|---|---|---|---|
| 30 | 3.0 | Cp | 0.15 | 0.30 | " | " |
| 31 | 5.0 | Cp | 0.15 | 0.30 | " | " |
| 32 | 3.0 | Cp | 0.10 | 0.20 | " | " |
| 33 | 2.5 | Cp | 0.05 | 0.10 | " | " |
| 34 | 3.0 | Np | — | — | " | " |
| Comparative Example 15 | 1.0 | Up | 1.00 | 2.50 | Ovalbumin | 45000 |

Note:
*[1]Water permeability $m^3/m^2 \cdot day \cdot atm \cdot$ water at 25° C.
*[2]Average pore diameter and maximum pore diameter were measured by means of a scanning electron photomicrograph (magnification: × 1000 to 10000)

400 Hollow fibers as prepared in Examples 34 were bundled into a module and unified by means of an adhesive at both end portions thereof (the resulting module is hereinafter referred to as "module of the present invention"). 400 hollow fibers as prepared in Comparative Example 15 were bundled into a module in the same manner as mentioned above (the resulting module is hereinafter referred to as "comparative module"). By using each of the thus obtained modules, filtration of a 30° C. water was carried out for a week, while back-washing of said module was effected (at a pressure of 0.5 kg/cm²) for 3 minutes at a frequency of once an hour. The effective length of the fiber was 20 cm, the pressure at the inlet portion was 2 kg/cm² and the pressure at the outlet portion was 0 kg/cm².

After the one-week operation, each module was disassembled and the hollow fiber bundle was taken out to examine the state of fibers. As a result of the examination, it was found that the hollow fiber bundle constituting the comparative module had been ruptured at several portions thereof. On the other hand, no damage was observed in the hollow fiber bundle constituting the module of the present invention. From the above, it will be understood that the hollow fiber obtained in Comparative Example 15 is so poor in mechanical strength that it cannot withstand a long-time continuous filtration operation.

Another module of the present invention and another comparative module were prepared in the same manner as mentioned above. Each of the modules was subjected to a continuous water filtration operation (30° C. water) effected for a week. In the operation, back-washing of the module was effected, at a pressure of 0.2 kg/cm², for a 3 minutes at a frequency of once an hour. The pressure at the inlet portion was 0.2 kg/cm² and the pressure at the outlet portion was 0.1 kg/cm². The resulting filtrate was subjected to a limurus test to examine the presence or the absence of pyrogen. As a result, pyrogen was not detected from the filtrate obtained using the module of the present invention but was detected from the filtrate obtained using the comparative module. The examination of each of the modules was effected using a scanning electron microscope after the continuous filtration operation. As a result, a large amount of dead or living bacteria were detected in the void layer and on the outer surface of the hollow fibers constituting the comparative module. By contrast, with respect to the module of the present invention, such bacteria were not detected.

Still another module of the present invention and still another comparative module were prepared in the same manner as described above. Each of the modules was subjected to a continuous filtration operation in the same manner as described just above. Thereafter, each of the modules was immersed in a 0.5% aqueous alkaline solution for a day and, thereafter, washed sufficiently with a pyrogen-free water. However, in the above step, pyrogen cannot be completely removed from the comparative module while pyrogen can be easily removed from the module of the present invention. Subsequently, the module of the present invention was subjected to a continuous water filtration operation for a week in the same manner as mentioned above. In the above operation, the obtained filtrate was free from pyrogen.

From the results as set forth above, it is understood that the hollow fiber membrane obtained in Comparative Example 15, in which pores having an average pore diameter of 1.00 μm and a maximum pore diameter of 2.50 μm were formed in the outer surface thereof, easily allows bacteria to enter the membrane. The bacteria present in the membrane propagate, causing generation of pyrogenic substances. Accordingly, if the hollow fiber membrane obtained in Comparative Example 15 is used for filtration of water, the resulting filtrate is liable to be contaminated by pyrogenic substances and, hence, a pyrogen-free water can hardly be obtained.

The term "pyrogen" as referred to herein means polyribosaccharide molecules present in the epidermis of the bacteria.

COMPARATIVE EXAMPLE 16

16 wt% of the same polysulfone as employed in Example 1, 55 wt% of DMAc as the solvent and, as the additive, 27 wt% of dimethylsulfoxide and 2 wt% of a 50% aqueous NaNo₃ solution were mixed, thereby to obtain a homogeneous resins solution.

The thus obtained resin solution was spun into a hollow fiber in substantially the same manner as in Example 1 except that 0 cm of the running-in-air distance was employed. The resulting hollow fiber membrane had a uniform structure in which no voids were present. The properties of the resulting hollow fiber membrane were examined and the results obtained are shown in Table 6.

EXAMPLE 35

The same polysulfone as employed in Example 1, DMAc as the solvent and TEG as the additive were mixed in a weight ratio of 16:74:10, thereby to obtain a homogeneous resin solution.

The thus obtained resin solution was spun into a hollow fiber in substantially the same manner as in Example 1 except that 0 cm of the running-in-air distance was employed. The properties of the resulting hollow fiber membrane were examined and the results obtained are shown in Table 6.

TABLE 6

| Example No. | Additive | Polysulfone, wt % | DMAc, wt % | Additive, wt % | Burst Strength, kg/cm² | Water[*1] permeability |
|---|---|---|---|---|---|---|
| Comparative Example 16 | Dimethyl sulfoxide/ 50% aq. NaNo₃ soln.[*2] | 16 | 55 | 27/2 | 8 | 4 |
| Example 35 | Tetraethylene glycol | 16 | 74 | 10 | 18 | 20 |

Note:
[*1] Water permeabilty: $m^3/m^2 \cdot day \cdot atm$ at 25° C.
[*2] A 50% aqueous NaNo₃ solution

EXAMPLE 36 TO 38

Hollow fiber membranes were prepared in substantially the same manner as in Example 1 except that the polysulfone and DMAc were mixed in varied weight proportions so that spinning solutions differing in polysulfone concentration were prepared. The properties of the resulting hollow fiber membrane were examined and the results obtained are shown in Table 7.

EXAMPLE 39 AND 40

Hollow fiber membranes were prepared in substantially the same manner as in Example 1 except that the kind of the solvent was varied as indicated in Table 8. The properties of the resulting hollow fiber membranes were examined and the results obtained are shown in Table 8.

TABLE 8

| | | | | A_i layer | | | |
|---|---|---|---|---|---|---|---|
| | | | | | | Pores[*2] | |
| Example No. | Solvent | Burst strength, kg/cm² | Water[*1] permeability | Thickness, μm | Kind of pores | Average pore diameter, μm | Maximum pore diameter, μm |
| 39 | N—methyl pyrrolidone | 15 | 18 | 1.8 | Np | — | — |
| 40 | Dimethylsulfoxide | 14 | 19 | 1.8 | Np | — | — |

| | A_o layer | | | | Cut-off molecular weight | |
|---|---|---|---|---|---|---|
| | | | Pores[*2] | | | |
| | | | | Average | Maximum | | |
| Example No. | Thickness, μm | Kind of pores | Average pore diameter, μm | Maximum pore diameter, μm | Kind of protein employed | Molecular weight |
| 39 | 4 | Cp | 0.10 | 0.20 | Ovalbumin | 45000 |
| 40 | 4 | Cp | 0.10 | 0.20 | Ovalbumin | 45000 |

Note:
[*1] Water permeability: $m^3/m^2 \cdot day \cdot atm \cdot$ water at 25° C.
[*2] Average pore diameter amd maximum pore diameter were measured by means of a scanning electron photomicrograph (magnification: × 1000 to 10000)

The conditions employed and the results obtained in Examples and Comparative Examples as described before will be summarized in Table 9.

TABLE 7

| | | | | | | | A_i layer | | |
|---|---|---|---|---|---|---|---|---|---|
| | | | | | | | | pores[*2] | |
| Example No. | Polysulfone, wt % | DMAc, wt % | TEG, wt % | Burst strength, kg/cm² | Water[*1] permeability | Thickness, μm | Kind of pores | Average pore diameter, μm | Maximum pore diameter, μm |
| 36 | 16 | 74 | 10 | 15 | 20 | 2 | Np | — | — |
| 37 | 25 | 65 | 10 | 27 | 12 | 2 | Np | — | — |
| 38 | 27 | 60 | 10 | 30 | 9 | 2 | Np | — | — |

| | A_o layer | | | | Cut-off molecular weight | |
|---|---|---|---|---|---|---|
| | | | pores[*2] | | | |
| Example No. | Thickness, μm | kind of pores | Average pore diameter, μm | Maximum pore diameter, μm | kind of protein employed | Molecular weight |
| 36 | 5 | Cp | 0.20 | 0.30 | Ovalbumin | 45000 |
| 37 | 4 | Cp | 0.05 | 0.10 | " | " |
| 38 | 5 | Cp | 0.05 | 0.10 | " | " |

Note:
[*1] Water permeability: $m^3/m^2 \cdot day \cdot atm \cdot$ water at 25° C.
[*2] Average pore diameter and maximum pore diameter were measured by means of a scanning electron photomicrograph (magnification: × 1000 to 10000)

TABLE 9

| Example No. | Resin Kind | Resin Amount, wt % | Solvent Kind | Solvent Amount, wt % | Additive Kind | Additive Amount, wt % | Resin soln. temp., °C | Orifice width, μm | Running-in-air distance, cm | Internal coagulating liquid Kind | Internal coagulating liquid Temp., °C | External coagulating liquid Kind | External coagulating liquid Temp., °C | Type | Inner diameter, μm | Outer diameter, μm | Membrane thickness, μm | Membrane structure |
|---|---|---|---|---|---|---|---|---|---|---|---|---|---|---|---|---|---|---|
| 1 | PS | 20 | DMAc | 71 | TEG | 9 | 30 | 45 | 1.5 | H₂O | 30 | H₂O | 30 | HF | 200 | 276 | 38 | 3 layers |
| 2 | " | " | " | " | " | " | " | 30 | " | " | " | " | " | " | 500 | 550 | 25 | " |
| 3 | " | " | " | " | " | " | " | 45 | " | " | " | " | " | " | " | 580 | 40 | " |
| 4 | " | " | " | " | " | " | " | 55 | " | " | " | " | " | " | " | 600 | 50 | " |
| 5 | " | " | " | " | " | " | " | 80 | " | " | " | " | " | " | " | 640 | 70 | " |
| 6 | " | " | " | " | " | " | " | 90 | " | " | " | " | " | " | " | 660 | 80 | " |
| 7 | " | " | " | " | " | " | " | 105 | " | " | " | " | " | " | " | 690 | 95 | " |
| Comparative Example 1 | " | " | " | " | " | " | " | 180 | " | " | " | " | " | " | " | 800 | 150 | 5 layers |
| 8 | " | " | " | " | " | " | " | 90 | 0 | " | " | " | 50 | " | " | 660 | 80 | 3 layers |
| 9 | " | " | " | " | " | " | " | 90 | " | " | " | Kerosene | 30 | " | " | " | " | " |
| Comparative Example 2 | " | " | " | " | " | " | " | 150 | " | " | " | " | " | " | 420 | 700 | 140 | " |
| Comparative Example 3 | " | " | " | " | " | " | " | 50 | — | " | — | None | — | " | 500 | 540 | 20 | 2 layers |
| Comparative Example 4 | " | " | " | " | " | " | " | 100 | — | " | — | " | — | " | " | 600 | 50 | " |
| Comparative Example 5 | " | " | " | " | " | " | " | 150 | — | " | — | " | — | " | " | 660 | 80 | " |
| Comparative Example 6 | " | " | " | " | " | " | " | 200 | — | " | — | " | — | " | " | 690 | 95 | " |
| Comparative Example 7 | " | " | " | " | " | " | " | — | — | Water (30° C.) | — | — | — | FH | — | — | 100 | 3 layers |
| 10 | PES | " | " | 65 | " | 15 | " | 55 | 3.0 | H₂O | 30 | H₂O | 30 | HF | 500 | 600 | 50 | " |
| Comparative Examples 8 to 13 | PS | " | " | 71 | " | 9 | " | — | — | Water (30° C.) | | | | FM | — | — | 10 to 90 See FIG. 9 | " |
| Comparative Example 14 | " | 16 | " | 75 | " | " | " | — | " | | | | | | — | — | 40 | " |
| 11 | " | 20 | " | 71 | EG | 9 | " | 55 | 1.5 | H₂O | 30 | H₂O | 30 | HF | 500 | 600 | 50 | " |
| 12 | " | " | " | " | DEG | " | " | " | " | " | " | " | " | " | " | " | " | " |
| 13 | " | " | " | " | TriEG | " | " | " | " | " | " | " | " | " | " | " | " | " |
| 14 | " | " | " | " | EG/LiCl | 6/3 | " | " | " | " | " | " | " | " | " | " | " | " |
| 15 | " | " | " | " | PEG 200*1 | 9 | " | " | " | " | " | " | " | " | " | " | " | " |

TABLE 9-continued

| Example No. | Resin | | Solvent | | Additive | | Resin soln. temp., °C | Orifice width, μm | Running-in-air distance, cm | Coagulating liquid | | | | Membrane | | | | |
| | Kind | Amount, wt % | Kind | Amount, wt % | Kind | Amount, wt % | | | | Internal coagulating liquid | | External coagulating liquid | | Inner diameter, μm | Outer diameter, μm | Membrane thickness, μm | Membrane structure |
| | | | | | | | | | | Kind | Temp., °C | Kind | Temp., °C | Type | | | | |
| 16 | " | " | " | " | PEG 6000*1 | " | " | " | " | " | " | " | " | " | " | " | " | " |
| 17 | " | " | " | " | PG | " | " | " | " | " | " | " | " | " | " | " | " | " |
| 18 | " | " | " | " | DPG | " | " | " | " | " | " | " | " | " | " | " | " | " |
| 19 | " | " | " | " | PEG 1000*1 | " | " | " | " | " | " | " | " | " | " | " | " | " |
| 20 | " | " | " | " | PPG 3000*1 | " | " | " | " | " | " | " | " | " | " | " | " | " |
| 21 | " | " | " | " | TEG | " | " | 60 | 0 | 50% aq. DMAc soln. | " | 50% aq. DMAc soln. | " | " | 610 | 55 | " |
| 22 | " | " | " | " | " | " | " | " | " | " | " | " | " | " | " | " | " |
| 23 | " | " | " | " | " | " | " | 55 | " | H₂O | " | H₂O | " | " | 600 | 50 | " |
| 24 | " | " | " | " | " | " | " | 60 | 10 | " | " | 50% aq. DMAc soln. | " | " | 610 | 55 | " |
| 25 | " | " | " | " | " | " | " | 110 | 20 | H₂O | " | H₂O | " | " | 650 | 75 | " |
| 26 | " | " | " | " | " | " | " | 90 | 15 | " | " | " | " | " | 620 | 60 | " |
| 27 | " | " | " | " | " | " | " | 70 | 10 | " | " | " | " | " | 610 | 55 | " |
| 28 | " | " | " | " | " | " | " | 60 | 7 | " | " | " | " | " | 600 | 50 | " |
| 29 | " | " | " | " | " | " | " | " | 5 | " | " | " | " | " | " | " | " |
| 30 | " | " | " | " | " | " | " | 70 | 3 | " | " | " | " | " | " | " | " |
| 31 | " | " | " | " | " | " | " | " | 2 | " | " | " | " | " | 620 | 60 | " |
| 32 | " | " | " | " | " | " | " | " | 1.5 | " | " | " | " | " | 630 | 65 | " |
| 33 | " | " | " | " | " | " | " | " | 1.0 | " | " | " | " | " | 620 | 60 | " |
| 34 | " | " | " | " | " | " | " | " | 0 | " | " | " | " | " | 630 | 65 | " |
| Comparative Example 15 | " | " | " | " | " | " | " | 110 | 30 | " | " | " | " | " | 620 | 60 | " |
| Comparative Example 16 | " | 16 | " | 55 | DMSO/ 50% aq. NaNO₃ | 27/2 | " | 90 | 0 | " | " | " | " | " | 650 | 75 | A uniform layer |
| 35 | " | " | " | 74 | TEG | 10 | " | " | " | " | " | " | " | " | " | " | 3 layers |
| 36 | " | " | " | " | " | " | " | " | 1.5 | " | " | " | " | " | " | " | " |
| 37 | " | 25 | " | 65 | " | " | " | " | " | " | " | " | " | " | " | " | " |
| 38 | " | 27 | " | 60 | " | " | " | " | " | " | " | " | " | " | " | " | " |
| 39 | " | 20 | NMP | 71 | " | 9 | " | 60 | " | " | " | " | " | " | 600 | 50 | " |

TABLE 9-continued

| Example No. | Resin | | Solvent | | Additive | | Resin soln. temp., °C | Orifice width, μm | Running-in-air distance, cm | Coagulating liquid | | | | Membrane | | | |
| --- | --- | --- | --- | --- | --- | --- | --- | --- | --- | --- | --- | --- | --- | --- | --- | --- | --- |
| | | | | | | | | | | Internal coagulating liquid | | External coagulating liquid | | | | | |
| | Kind | Amount, wt % | Kind | Amount, wt % | Kind | Amount, wt % | | | | Kind | Temp., °C | Kind | Temp., °C | Type | Inner diameter, μm | Outer diameter, μm | Membrane thickness, μm | Membrane structure |
| 40 | " | " | DMF | " | " | " | " | " | " | " | " | " | " | " | " | " | " | " |

Note:
*¹Molecular weight
*²Water permeability: m³/m² · day · atm · water at 25° C.
*³Average pore diameter and maximum pore diameter were measured by means of a scanning electron photomicrograph (magnification: × 1000 to 10000)
Abbreviations Used in Table 9
PS: an aromatic polysulfone
PES: an aromatic polyether sulfone
DMAc: dimethylacetamide
NMP: N—methylpyrrolidone
DMF: dimethylformamide
TEG: tetraethylene glycol
EG: ethylene glycol
DEG: diethylene glycol
TriEG: triethylene glycol
PEG: polyethylene glycol
PG: propylene glycol
DPG: dipropylene glycol
PPG: polypropylene glycol
DMSO: dimethyl sulfoxide
HF: a hollow fiber membrane
FM: a flat membrane

| Inner surface layer (Ai layer) | | | Outer surface layer (Ao layer) | | | | Void layer (B layer) | | Properties | | | | |
|---|---|---|---|---|---|---|---|---|---|---|---|---|---|
| | Pores*3 | | | Pores*3 | | | | | | | Cut-off molecular weight | | |
| Thickness, μm | Kind of pores | Average pore diameter, μm | Maximum pore diameter, μm | Thickness, μm | Kind of pores | Average pore diameter, μm | Maximum pore diameter, μm | Thickness, μm | Number of voids | Burst strength kg/cm² | Water permeability*2 | Kind of protein employed | Molecular weight | Remarks |
| 1.7 | Np | — | — | 3.3 | Cp | 0.10 | 0.20 | 31 | More than 100 | 20 | 22 | Ovalbumin | 45000 | |
| 1.8 | " | — | — | 1.8 | " | " | 0.25 | 21 | More than 100 | 17 | 29 | Bovine serum albumin | 67000 | |
| " | " | — | — | 2.5 | " | " | " | 36 | More than 100 | 20 | 27 | Bovine serum albumin | " | |
| " | " | — | — | 3.0 | " | " | " | 45 | More than 100 | 21 | 25 | Ovalbumin | 45000 | |
| " | " | — | — | 3.2 | " | " | " | 65 | More than 100 | 25 | 23 | Trypsinogen | 24000 | |
| " | " | — | — | 3.5 | " | " | " | 75 | More than 100 | 26 | 22 | Lysozyme | 14000 | |
| " | " | — | — | 4.0 | " | " | 0.20 | 90 | More than 100 | 28 | 21 | Cytochrome C | 13000 | |
| " | " | — | — | 10.0 | Np | — | — | 138 | More than 100 | 32 | 2.5 | Insulin | 6000 | |
| " | " | — | — | 4.0 | " | — | — | 74 | More than 100 | 31 | 11 | " | " | |
| " | " | — | — | 9.0 | Cp | 0.20 | 0.40 | 70 | More than 100 | 30 | 10 | Lysozyme | 14000 | |
| " | " | — | — | 65 | " | " | 0.50 | 75 | More than 100 | 35 | 2.0 | " | " | |
| 4.0 | " | — | — | — | — | 5.00 | 10.00 | 26 | More than 100 | 2 | 9 | Ovalbumin | 45000 | |
| " | " | — | — | — | — | 10.00 | 15.00 | 46 | More than 100 | 5 | 3 | Trypsinogen | 24000 | |
| 5.0 | " | — | — | — | — | 12.00 | 20.00 | 75 | More than 100 | 8 | 2 | " | " | |
| " | " | — | — | — | — | 10.00 | " | 90 | About 100 | 9 | 2 | Lysozyme | 14000 | |
| 4.0 | " | — | — | 5.0 | Np | — | — | — | — | — | 0.01 | — | — | |
| 2.0 | " | — | — | 2.0 | Cp | 0.07 | 0.15 | 44 | More than 100 | 23 | 30 | Insulin | 6000 | |
| 3.0 | — | — | — | — | — | — | — | — | — | — | 0.1 to 1 See FIG. 9 | — | — | |
| 2.8 | — | — | — | — | — | — | — | — | — | — | 0.2 | — | — | |
| 2.0 | Np | — | — | 5.0 | Cp | 0.05 | 0.10 | 43 | More than 100 | 21 | 20 | Ovalbumin | 45000 | |
| " | " | — | — | 4.0 | " | " | " | 44 | More than 100 | " | 21 | " | " | |
| " | " | — | — | 5.0 | " | 0.08 | 0.15 | 43 | More than 100 | " | " | " | " | |
| 1.8 | " | — | — | 2.0 | " | 0.10 | 0.20 | 46 | More than 100 | 20 | 26 | Trypsinogen | 24000 | |
| " | " | — | — | 5.0 | " | " | 0.30 | 43 | More than 100 | " | 28 | Ovalbumin | 45000 | |

-continued

| Inner surface layer (Ai layer) | | | Outer surface layer (Ao layer) | | | | Void layer (B layer) | | Properties | | | | |
|---|---|---|---|---|---|---|---|---|---|---|---|---|---|
| Thickness, μm | Pores*3 Kind of pores | Average pore diameter, μm | Maximum pore diameter, μm | Thickness, μm | Pores*3 Kind of pores | Average pore diameter, μm | Maximum pore diameter, μm | Thickness, μm | Number of voids | Burst strength kg/cm² | Water permeability*2 | Cut-off molecular weight Kind of protein employed | Molecular weight | Remarks |
| 1.5 | " | — | — | 8.0 | Up | 0.40 | 0.70 | 41 | More than 100 | 18 | 32 | β-Galactose DH | 95000 | Proportion cut-off of bovine serum albumin (molecular weight: 67000) was 25% or more. |
| 1.8 | " | — | — | 2.0 | Cp | 0.10 | 0.20 | 46 | More than 100 | 20 | 28 | Ovalbumin | 45000 | |
| " | " | — | — | " | " | " | 0.30 | " | More than 100 | " | " | " | " | |
| 1.0 | " | — | — | 6.0 | " | 0.30 | 0.50 | 43 | More than 100 | " | 30 | Bovine serum albumin | 67000 | |
| " | " | — | — | 7.0 | Up | 0.40 | 0.70 | 42 | More than 100 | 17 | 33 | β-Galactose DH | 95000 | |
| 2.0 | " | — | — | 2.2 | Cp | 0.10 | 0.20 | 51 | 100 | 22 | 30 | Ovalbumin | 45000 | Proportion cut-off of bovine serum albumin molecular weight: 67000) was 25% |
| 2.3 | Cp | 0.10 | 0.20 | " | " | " | " | 50 | 70 | 17 | 32 | Bovine serum albumin | 67000 | |
| 2.0 | " | " | " | 1.8 | Np | — | — | 46 | 100 | 20 | 30 | Ovalbumin | 45000 | Proportion cut-off of bovine serum albumin (molecular weight: 67000) was 25% or more. |
| " | Np | — | — | 8.0 | Cp | 0.30 | 0.50 | 45 | 90 | 17 | 33 | β-Galactose DH | 95000 | |
| 2.3 | " | — | — | 1.0 | Up | 0.50 | 0.80 | 72 | More than 100 | 15 | 20 | Ovalbumin | 45000 | |
| 2.2 | " | — | — | 2.0 | " | 0.40 | 0.70 | 56 | More than 100 | " | 25 | Trypsinogen | 24000 | |
| 2.0 | " | — | — | 3.0 | " | " | 0.60 | 50 | More than 100 | " | " | " | " | |
| " | " | — | — | 4.0 | Cp | 0.20 | 0.40 | 44 | More than 100 | 16 | 26 | " | " | |
| " | " | — | — | 3.0 | " | 0.18 | 0.35 | 45 | More than 100 | " | 25 | " | " | |
| 2.3 | " | — | — | " | " | 0.15 | 0.30 | " | More than 100 | 18 | 23 | " | " | |
| " | " | — | — | 5.0 | " | " | " | 53 | More than 100 | 25 | 22 | " | " | |
| 1.8 | " | — | — | 3.0 | " | 0.10 | 0.20 | 62 | More than 100 | 26 | 23 | " | " | |
| " | " | — | — | 2.5 | " | 0.05 | 0.10 | 66 | More than 100 | 25 | 20 | " | " | |
| 2.0 | " | — | — | 2.0 | Np | — | — | 61 | More than 100 | 7 | " | " | " | |
| " | " | — | — | 1.0 | Up | 1.00 | 2.50 | 57 | More than 100 | 8 | 38 | Ovalbumin | 45000 | |
| — | " | — | — | — | Np | — | — | — | 0 | 8 | 4 | " | " | |
| 2.0 | " | — | — | 2.0 | " | — | — | 71 | More than | 18 | 20 | " | " | |

-continued

| Inner surface layer (Ai layer) | | | | Outer surface layer (Ao layer) | | | | Void layer (B layer) | | Properties | | | | |
|---|---|---|---|---|---|---|---|---|---|---|---|---|---|---|
| | Pores*3 | | | | Pores*3 | | | | | | | | Cut-off molecular weight | |
| Thickness, μm | Kind of pores | Average pore diameter, μm | Maximum pore diameter, μm | Thickness, μm | Kind of pores | Average pore diameter, μm | Maximum pore diameter, μm | Thickness, μm | Number of voids | Burst strength kg/cm² | Water permeability*2 | Kind of protein employed | Molecular weight | Remarks |
| " | " | — | — | 5.0 | Cp | 0.20 | 0.30 | 68 | More than 100 | 15 | " | " | " | " |
| " | " | — | — | 4.0 | " | 0.05 | 0.10 | 69 | More than 100 | 27 | 12 | " | " | " |
| " | " | — | — | 5.0 | " | " | " | 68 | More than 100 | 30 | 9 | " | " | " |
| 1.8 | " | — | — | 4.0 | " | 0.10 | 0.20 | 44 | More than 100 | 15 | 18 | " | " | " |
| " | " | — | — | " | " | " | " | " | More than 100 | 14 | 19 | " | " | " |

In the meantime, the membrane thickness of the hollow fiber membrane of the present invention is defined as the minimum distance between the outer and inner peripheries of the hollow fiber membrane.

What is claimed is:

1. An aromatic polysulfone type resin hollow fiber membrane having a thickness of less than 100 μm and a three-layer structure of inner and outer surface skin layers and a void layer disposed therebetween and connected thereto; said void layer having a thickness of at least 5 μm and comprising at least 30 voids each having a length of 5 μm or more in a radial direction of a cross section of said hollow fiber membrane, said inner and outer skin layers each having a maximum pore diameter of 0.80 μm or less and a thickness of 0.1 to 10 μm, provided that the average value of thicknesses of said inner and outer surface skin layers is ½ or less the thickness of said void layer; said hollow fiber membrane having a cut-off molecular weight of less than 100,000.

2. A hollow fiber membrane according to claim 1, which has a water permeability of at least 9 m$^3$/m$^2$·day·atm.

* * * * *